US011901853B1

United States Patent
Parlos et al.

(10) Patent No.: US 11,901,853 B1
(45) Date of Patent: Feb. 13, 2024

(54) TECHNOLOGY FOR SENSORLESS DETECTION OF REVERSE ROTATION AND SPEED ESTIMATION FOR ELECTRIC MACHINES

(71) Applicant: Veros Systems, Inc., Austin, TX (US)

(72) Inventors: Alexander George Parlos, Austin, TX (US); Gang Li, Austin, TX (US)

( * ) Notice: Subject to any disclaimer, the term of this patent is extended or adjusted under 35 U.S.C. 154(b) by 1604 days.

(21) Appl. No.: 16/005,571

(22) Filed: Jun. 11, 2018

Related U.S. Application Data

(60) Provisional application No. 62/484,816, filed on Apr. 12, 2017.

(51) Int. Cl.
 *H02P 23/12* (2006.01)
 *H02P 6/17* (2016.01)
 *H02P 6/28* (2016.01)
 *H02P 6/26* (2016.01)

(52) U.S. Cl.
 CPC .............. *H02P 6/17* (2016.02); *H02P 6/26* (2016.02); *H02P 6/28* (2016.02)

(58) Field of Classification Search
 CPC ............ H02P 6/26; H02P 6/17; H02P 6/28
 See application file for complete search history.

(56) References Cited

U.S. PATENT DOCUMENTS

| 2006/0125439 | A1* | 6/2006 | Ajima | B60L 50/16 318/716 |
| 2011/0279077 | A1* | 11/2011 | Sohara | G05B 19/404 318/639 |
| 2012/0249037 | A1* | 10/2012 | Iwamiya | H02P 7/29 318/459 |
| 2013/0187582 | A1* | 7/2013 | Nishimura | H02P 6/10 318/400.14 |
| 2016/0133413 | A1* | 5/2016 | Bock | H01H 50/026 361/142 |

* cited by examiner

*Primary Examiner* — Kawing Chan
*Assistant Examiner* — Gabriel Agared
(74) *Attorney, Agent, or Firm* — Anthony V. S. England; Susan M. Maze

(57) ABSTRACT

For determining rotation of a de-energized electric machine without accessing the machine, wherein the machine in the energized state rotates in a reference direction, a computer system determines, for at least one waveform of at least one set of multi-phase electrical power indicia measured remotely from the machine, that a first time segment of the at least one waveform corresponds to an energized state of the machine and that a second time segment of the at least one waveform corresponds to a de-energized state of the machine. The computer system also determines that the machine in the de-energized state has rotated in a direction reverse to the reference direction, wherein the determining that the machine in the de-energized state has rotated in a direction reverse to the reference direction includes comparing the first and second time segments of the at least one waveform.

20 Claims, 30 Drawing Sheets

TECHNOLOGY FOR SENSORLESS DETECTION OF REVERSE ROTATION AND SPEED ESTIMATION FOR ELECTRIC MACHINES

CROSS-REFERENCE TO RELATED APPLICATIONS

This application hereby incorporates herein by reference and claims benefit of the priority date of U.S. provisional patent application 62/484,816, which has a filing date of 12 Apr. 2017.

FIELD OF THE INVENTION

The field of the present invention concerns, in part, determining direction of rotation for a de-energized electric machine without physically accessing the machine.

SUMMARY

In a computer system implemented method for determining rotation of a de-energized electric machine without accessing the machine, wherein the machine in the energized state rotates in a reference direction, the computer system determines, for at least one waveform of at least one set of multi-phase electrical power indicia measured for the machine remotely from the machine, that a first time segment of the at least one waveform corresponds to an electrically energized state of the machine and that a second time segment of the at least one waveform corresponds to an electrically de-energized state of the machine. Since the second time segment of at the least one waveform of is for the de-energized state, the second time segment is for times when the at least one waveform arises from power induced on supply conductors for the machine by rotation of the machine.

The computer system also determines that the machine in the de-energized state has rotated in a direction reverse to the reference direction, wherein the determining that the machine in the de-energized state has rotated in a direction reverse to the reference direction includes the computer system comparing the first and second time segments of the at least one waveform.

In another aspect, the computer system determines that the machine in the de-energized state has rotated in a direction reverse to the reference direction includes: detecting by the computer system, for the first time segment of the at least one waveform, a first phase sequence of the at least one set of power indicia. The computer system detects, for the second time segment of the at least one waveform, a second phase sequence of the at least one set of power indicia. The computer system compares the first and second time segments of the at least one waveform includes the computer system comparing the first and second phase sequences of the at least one waveform. The determining that the machine in the de-energized state has rotated in a direction reverse to the reference direction includes detecting, based on the comparing, that the second phase sequence does not correspond to the first phase sequence.

In another aspect, the at least one set of power indicia include power indicia for the supply conductors.

In another aspect, the supply conductors are conductively coupled between a switch and the machine for connecting and disconnecting the machine via the switch to an electrical power distribution network. The at least one set of power indicia is measured between the switch and ends of the supply conductors that are remote from the machine.

In another aspect, the machine is a generator and the supply conductors for the machine in the energized state supply power from the machine through the switch to the power distribution network.

In another aspect, the machine is a motor and the supply conductors for the machine in the energized state supply power from the PDN through the switch to the machine.

In another aspect, the determining by the computer system that a first time segment of the at least one waveform corresponds to an electrically energized state of the machine and that a second time segment of the at least one waveform corresponds to an electrically de-energized state of the machine is based solely on the at least one set of power indicia.

In another aspect, the determining by the computer system that a first time segment of the at least one waveform corresponds to an electrically energized state of the machine and that a second time segment of the at least one waveform corresponds to an electrically de-energized state of the machine is based on frequency of the at least one set of power indicia.

In another aspect, power indicia for the supply conductors including voltages, where the determining that a first time segment of the at least one waveform corresponds to an electrically energized state of the machine and that a second time segment of the at least one waveform corresponds to an electrically de-energized state of the machine is based on the voltages for the supply conductors.

In another aspect, power indicia for the supply conductors include currents, where the determining that a first time segment of the at least one waveform corresponds to an electrically energized state of the machine and that a second time segment of the at least one waveform corresponds to an electrically de-energized state of the machine is based on currents for the supply conductors.

In another aspect, the power indicia for the first set of waveforms are different than for the second set of waveforms.

In another aspect, the computer system determines how long the machine rotated in the reverse direction by determining a duration for which the at least second phase sequence occurred.

In another aspect, the computer system determines a frequency at which the machine rotated in the reverse direction in the de-energized state, where determining the frequency includes determining a frequency of the second measured waveforms.

In another aspect, the at least one waveform is a recorded waveform.

In another aspect, the method includes recording the at least one waveform, wherein the determining that the first time segment of the at least one waveform corresponds to an electrically energized state of the machine and that a second time segment of the at least one waveform corresponds to an electrically de-energized state of the machine is performed by the computer system at least partly in concurrence with the recording.

In other embodiments of the invention, other forms are provided, including a system and a computer program product.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Figure 1:
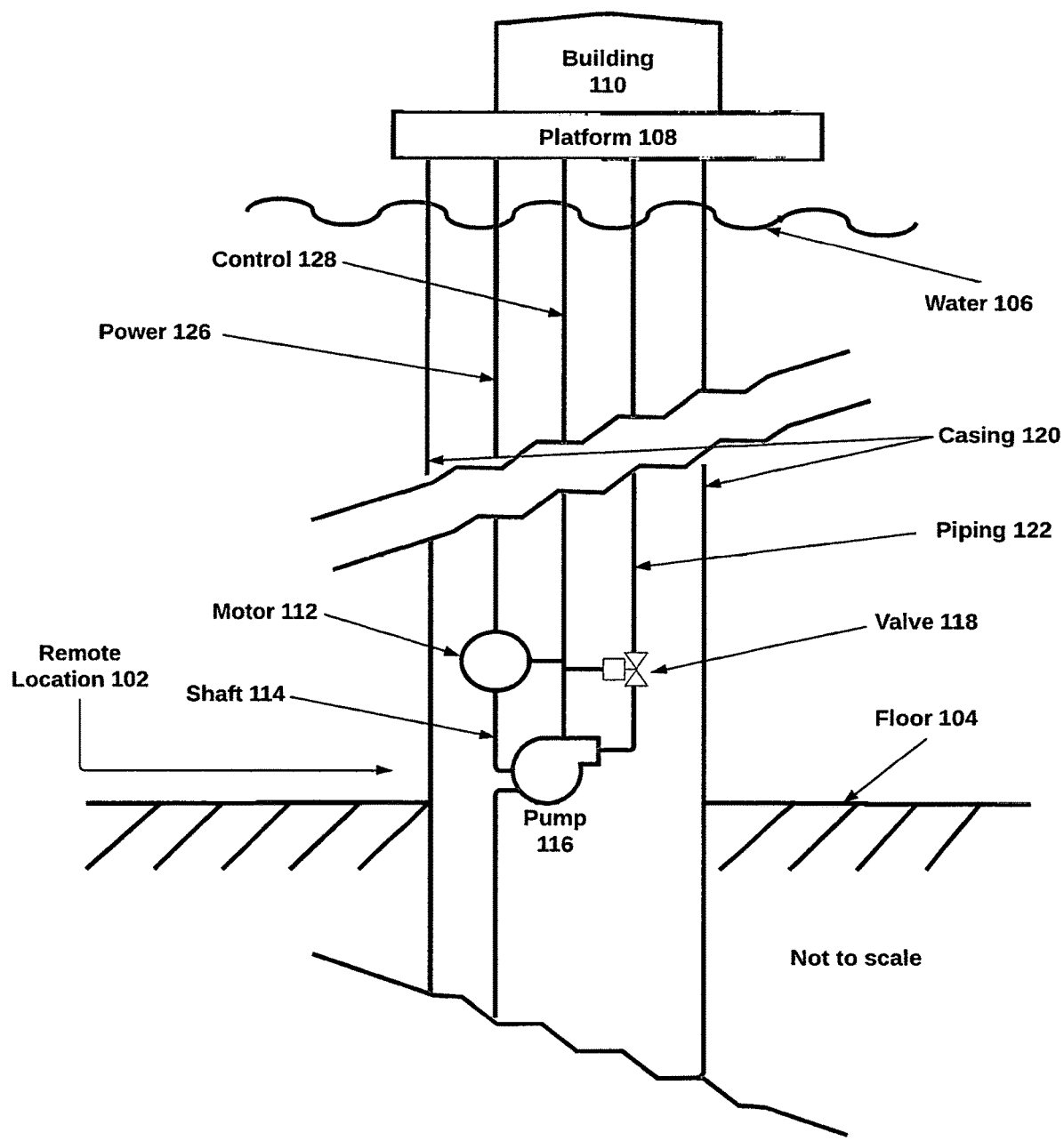
FIG. 1 (Prior Art) schematically depicts an offshore electric motor that drives a pump.

A "sensorless" system disclosed herein is used for application to electric machines, i.e. motors or generators. In a motor application, for example, the term "sensorless" means that no sensors are required on either the motor, itself, nor on a load driven by the motor. That is, the sensorless system may use no sensors other than electrical sensors located remote from the motor, such as at motor switch in a control center where circuit conductors for the machine terminate or in an enclosure for a variable frequency drive ("VFD") that varies the frequency of the electrical supply to the motor. (The terminated ends of those conductors in the control center or VFD enclosure may be referred to herein as "machine terminals.")

In particular, the system is configured to determine and present indications of the following, according to embodiments of the present invention:
 a. detection of reverse rotation of the electric machine,
 b. estimation of the duration of the reverse rotation of the electric machine, and
 c. estimation of the synchronous speed of the electric machine during the reverse rotation.

As stated herein above, example machines include electric motors and electric generators. Motors include those operated at constant frequency and those operated through the use of VFD's. All types of electric motors and generators are included, such as induction, synchronous, etc.

Examples of mechanical driven and driver devices include pumps, compressors, fans, turbines, engines, conveyor belts, etc. That is, examples include all types of mechanical devices that are driven by electric motors and all types of mechanical devices that drive electric generators, including those with gear-boxes in between motor and driven load, or between prime mover and generator.

Such electric machines and driven/driver devices are found in power plants, processing plants, manufacturing facilities, commercial or other buildings, transportation equipment, medical devices, etc.

In one embodiment, the system includes one or more distributed nodes (also referred to as "end-points") attached to a power distribution network (PDN) supplying electric power to the machines, and one or more centralized or decentralized computing platforms (local or cloud servers) interfaced to an information network or inter-network infrastructure, e.g. the Internet. The nodes may be embedded in the existing electrical infrastructure, e.g. within a VFD.

The system can have one or more nodes for detecting the reverse rotation events in one or more electric machines.

The system includes hardware residing in the nodes and the servers. The system also includes software. The system software executes concurrently or intermittently on all the nodes and all servers.

Each node has an electrical interface connecting to the PDN at any one of several possible locations, e.g. device terminals, switchgear or voltage bus. The electrical interface is used to do the following:
 a. power the node,
 b. measure one or more phases of voltages, either directly or through potential transformers, and
 c. measure one or more phases of currents, either directly or through current transformers.

The node can be used to measure the electrical voltages, the electrical currents or both.

Each node has an embedded computing platform for sampling one or more analog signals and for processing them. The platform includes a CPU or DSP, memory, etc., that is all components found in an embedded computer.

Each node has a wireless interface for communicating data and/or other information to the servers. The communication interface could be based on WiFi, WiMax, ZigBee or any other IEEE standard or otherwise protocol or it could be a cellular interface. The multiple nodes of the system form a wireless LAN (WLAN) which consists of the nodes, wireless bridges, routers, repeaters, etc. The WLAN is interfaced to a wired network and it could be operated in "infrastructure" or "ad-hoc" mode.

In view of the interfaces found in a node, each node may be characterized as a networked, embedded device without sensor interfaces, i.e., not requiring sensor interfaces for sensors on either the motor or on a load driven by the motor, as indicated herein above regarding the term "sensorless."

The centralized or decentralized computing platforms (servers) communicating with the nodes can be accessed via the Web or via e-mail over the Internet or Intranet, displaying information related to reverse rotation events, in either graphical or textual form. This remote access of continuous information streams enables the system to be used in a service mode.

In one embodiment, the system is configured such that each node is interfaced, is associated with and manages a single electric machine. In this embodiment, each node is made up of a single power interface in the form of a power printed circuit board (PCB) and a single computing PCB, with a single electrical measurement interface. Each node also has a single wireless interface.

In another embodiment, the system is configured such that each node is interfaced, is associated with and monitors multiple electric machines. In this embodiment, each node is made up of a single power interface in the form of a power PCB and multiple computing PCBs, with multiple electrical measurement interfaces. Each node also has a single wireless interface.

Embodiments may include all other combinations of items described above.

A ForeSight™ Electrical Waveform Monitoring ("EWM") system was developed by Veros Systems, Inc., for monitoring and predictive intelligence about mechanical and electrical conditions of electrical machines. ("ForeSight" is a trademark of Veros Systems, Inc.) Embodiments of the present invention are described herein, which involve new applications of EWM systems for "sensorless" detection of reverse rotation and speed estimation of electric machines. Before describing the embodiments of the present invention, the present section is presented to describe one of the ForeSight EWM systems for a customer's five electric machines and their respective driven devices, namely three centrifugal pumps and two compressors. (Such a machine of the customer's may be referred to herein as an "asset," as may its respectively associated driven device. The machine and its driven device may also be referred to collectively as an "asset" or may be referred to as an "asset package.") The EWM system was installed before development and testing of the present invention. Information from the installed ForeSight EWM system, which is remote from the assets, flows in a standard interoperability format, as defined by the OPC Foundation, to a monitoring and control location of the customer's, which is also remote from the assets.

Referring now to FIG. 1, a layout (not to scale) is shown as is known in the prior art for a typical asset package in its installed environment. In this instance, the asset package includes a motor 112, a pump 116 and a valve 118 at a location 102 near a floor 104 of a body of water 106. Location 102 is remote from an above-water platform 108 having a monitoring and control building 110. Motor 112 is connected via its shaft 114 to a pump 116, which has a valve 118 connecting its outlet to piping 122. (In the illustrated instance, piping 122 is in casing 120 for pumping fluid such as oil or gas up to equipment on platform 108. However, other arrangements are known, such as where piping 122 runs elsewhere, i.e., other than in casing 120 and/or other than to platform 120.) Measurement and control signals are carried in casing 120 via electrical measurement and control cable 128 from motor 112 and pump 116 to building 110. Power cable 126 in casing 120 supplies electrical power to primary leads of motor 112 from PDN equipment in building 110. (A cable or its conductors connected to a machine's primary leads, such as cable 126, may be referred to herein as "primary leads.")

Regarding primary leads, for an induction motor 112, for example, the motor's primary windings on one member (usually the stator) are typically configured for external connection to a power source as primary leads in a junction box mounted on the motor's case. A secondary winding on the other member (usually the rotor) carries currents induced by currents in the primary windings.

Once each remote asset package was installed, each was equipped with a set of instruments connected inside the electric machine or driven device and sent via a single mono-conductor cable to power the sensors and transfer signals to the remote monitoring and control location. These sets of instruments at the assets provided conventional gauging and monitoring that heretofore sought to optimize output without the improvements provided by the ForeSight EWM system. Among the signals provided by sets of conventional instruments on each asset package were the following:

motor winding temperatures;
pump/compressor flow rate;
pump/compressor discharge pressures/temperatures; and
pump/compressor intake X and Y vibrations.

These signals from the instruments provided useful information to operate each remote asset, but unexpected issues do occur on these critical assets, so the operator wanted more information to better operate and maintain these units. ForeSight EWM technology was developed to provide new insight into these particular kinds of assets.

Prior to introduction of the ForeSight EWM system, it was difficult to monitor assets such as the customer's due to their remote locations in a harsh environment. Further complicating matters, these particular machines have relatively short lives, are typically operated to the point of failure with no warning and are difficult and expensive to replace. Failure and replacement typically result in lost production, which is expensive.

ForeSight EWM systems are typically installed locally, such as in a building of a monitoring and control center for remotely installed electric machines. Specifically, the EWM system simply connects to a motor control center in such a building, for example, using current transformer (CT) and potential transformer (PT) connections, for example. Alternatively, the system may be installed in an enclosure of a variable frequency drive ("VFD") for a motor. Once installed, the EWM system monitors the voltage and current waveforms, such as at the interface of the VFD to the electric machine and creates a library of what normal operation looks like for that particular electric machine. By continuously monitoring the voltage and current waveforms, the ForeSight EWM system can detect any anomalies from normal operation and send out an appropriate alarm.

It is believed that ForeSight EWM will help transform the operation of these electric machines and their driven devices. Expected benefits include simple remote installation, increased visibility of the health of these assets and advanced notice of developing problems or inefficiencies. This advanced notification should allow operators to better plan for maintenance or replacement of these electric machines. This is of utmost importance when dealing with these remote assets as it is difficult and expensive to get maintenance personnel and equipment to them.

There are currently little to no other comparable options for effective monitoring of the above described, hard to access, remote equipment, whereas ForeSight EWM technology may be applied to this and many different types of equipment, resulting in reduced cost and improve planning for the customer's operation of these assets.

Lost production from unexpected failure of these remote assets causes lost operating profit. A wide variety of technologies (i.e., technologies other than ForeSight EWM) have been long used to monitor these important assets on a continuous basis, but these other systems are not 100% reliable. Further, they typically require that sensors be installed on the rotating assets themselves. Installation and maintenance of these sensors is costly, and sometimes impossible, given the locations of the machines.

Being able to forecast the electrical or mechanical degradation of a motor or a pump allows an operator to proactively manage the situation. By reducing load, the operator can even extend the time the asset will operate before failure. By knowing an asset is nearing the end of its useful life, the owner can schedule the repair/replacement prior or in parallel to the upcoming downtime.

The ForeSight EWM system continually samples line voltages and phase currents that feed electric motors. This means the ForeSight EWM system can be attached separately from the asset, such as within the VFD enclosure, for example. The voltage and current waveforms provide a way to watch movements of the motor rotor by carefully analyzing the waveforms in real-time. Using digital signal processing and machine learning algorithms, the ForeSight EWM system produces performance measurements such as motor load, efficiency, RPM and output torque along with machinery health measurements relating to the condition of the asset, both for mechanical and electrical issues.

Figure 2:
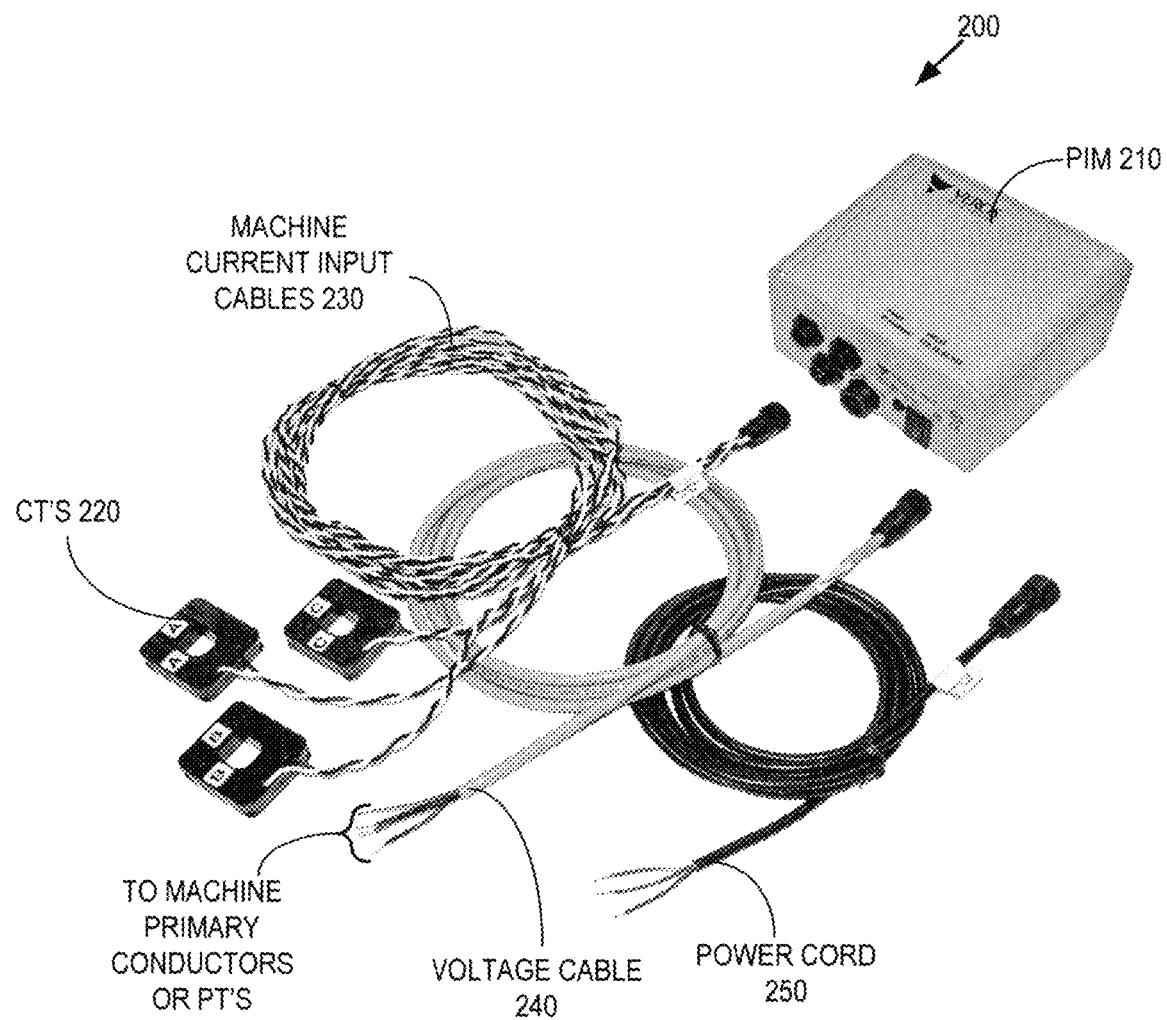
FIG. 2 depicts measurement components of ForeSight EWM technology, according to embodiments of the present invention.

As previously stated, ForeSight EWM technology is sensorless, in that no sensors are required on either the driven load 116 or the driver motor 112. Monitoring of a motor 112 power train is carried out using only the line 126 voltages and phase currents of electric motor 112, such as measured by the PT's and CT's in relays of motor 112 switches or at a VFD enclosure. Measurement components of ForeSight EWM technology are shown in FIG. 2, according to an embodiment. For a low voltage motor 112, a ForeSight EWM pre-processor 210 (also referred to as a "predictive intelligence module" or "PIM") is supplied with operating power via power cord 250 and connects via voltage input cable 240 directly to primary lines 126 of motor 112 for one set of measurement inputs. For medium or high voltage motors 112, PIM 210 connects via voltage input cable 240 to the secondary side of PT's or an instrument grade stepdown transformer. Split-core, shunted CT's 220 are placed on primary motor lines 126 or secondary side of relay CT's, which provide 0-5 ampere measurement input signals to PIM 210 via current input cable 230. For VFD systems, the ForeSight EWM PIM 210 connects between the VFD output and motor 112. Measurements are performed continuously at high sampling rates and bit resolution, enabling significant sensitivity to early detection of impending faults.

ForeSight EWM systems continuously analyze three-phase voltage and current waveforms that are supplied to the motor and its driven load. Using high frequency electrical measurements, statistical digital signal processing and advanced machine learning algorithms, the monitoring system continuously analyzes these electrical waveforms and arrives at key metrics used to detect and track mechanical problems. The source of information for mechanical fault detection is in the air gap flux variations. Depending on the nature of the mechanical faults the radial, axial and azimuthal (or torsional) variations in the motor air gap field distort the motor currents. Electrical faults are detected by adaptively developed system impedance models.

The technology is insensitive to power quality and process load variations. Furthermore, it does not require a priori knowledge of motor or driven load physical models or any detailed design parameters as the technology continuously adapts to the unique operation of a particular motor and its driven load.

For a ForeSight EWM system, nothing need be installed on the monitored machines such as motor 112. Instead, electrical data obtained remotely from the machines as described above are transferred to the server, which continuously analyzes the waveforms, identifying impending faults and calculating performance metrics. The system then produces predictive and actionable intelligence from each asset monitored, detecting both electric and mechanical faults. ForeSight EWM can detect anything from impending bearing issues to ground faults to damaged impellers.

The following describes installation at the customer's facility by Veros Systems, Inc., of a ForeSight EWM system for the customer's five electric machines. Connections were made at the output of a VFD for each machine, where inputs to the ForeSight EWM system for the customer are as follows:

Rated voltage 2×2278 V*
Rated power 2×750 hp
Rated current 200 A
Rated frequency 60 Hz
Rated speed 3500 rpm

*Each motor had two stators connected in series, each with a 750-horsepower rating, where the voltage drop across each stator was 2278 volts.

Figure 3:
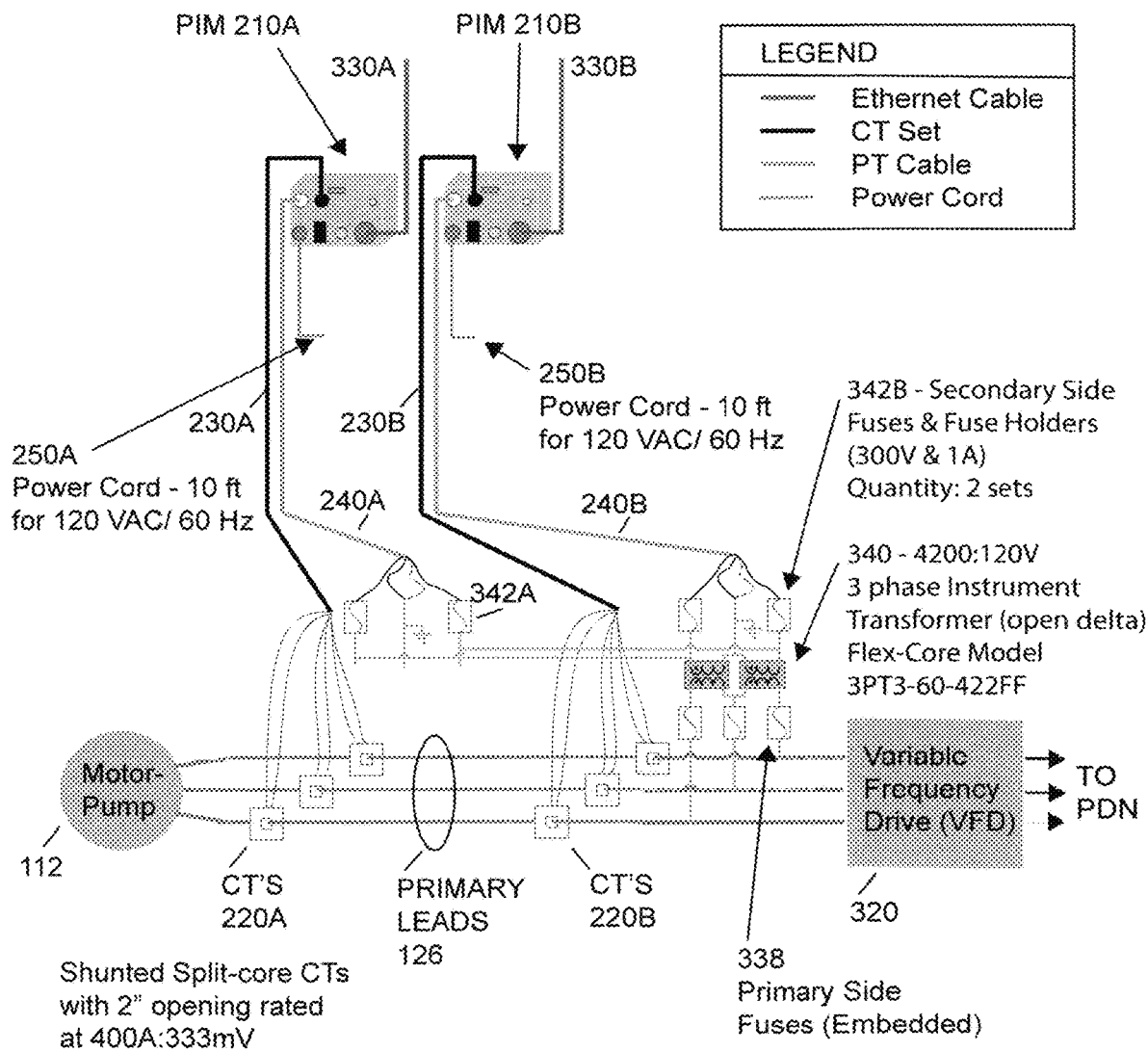
FIG. 3 depicts a measurement electrical schematic, according to embodiments of the present invention.

Referring to the measurement electrical schematic of FIG. 3, the layout of PT's 340, CT's 220A and 220B and ForeSight EWM PIM's 210A and 210B are shown. The electrical installation process included the following:

Placing a step-down instrument transformer (i.e., a potential transformer, also referred to as a "PT"), three-phase fuse holder and fuses inside the VFD enclosure, Connecting conductors from PT 340 primary side to conductors of a VFD 320 via primary fuse holders 338, Connecting conductors from PT 340 secondary side to one side of PT secondary fuse holders 342A and 342B, Connecting respective PT 340 input cables 240A and 240B to the other sides of the respective PT secondary fuse holders 342A and 342B, Attaching split core CT's 220A and 220B to VFD 320 conductors, i.e., placing primary wiring of CT's around the VFD conductors, where secondary wiring of the CT's is pre-wired via cables 230A and 230B to connectors that fit PIM's 210A and 210B for the respective CT's 220A and 220B, Connecting PIM's 210A and 210B respective power cords 250A and 250B to 120V source, Bringing the connector ends of the PT and CT secondary wiring via cables 240A and B and 230A and B to a low voltage cabinet of the VFD 320 enclosure, and plugging connectors of the cables 240A and B for PT's and 230A and B for CT's and of the power cords 250A and B into PIM's 210A and B and Connecting Ethernet cables 330A and B to PIM's 210 A and B respectively.

Figure 4:
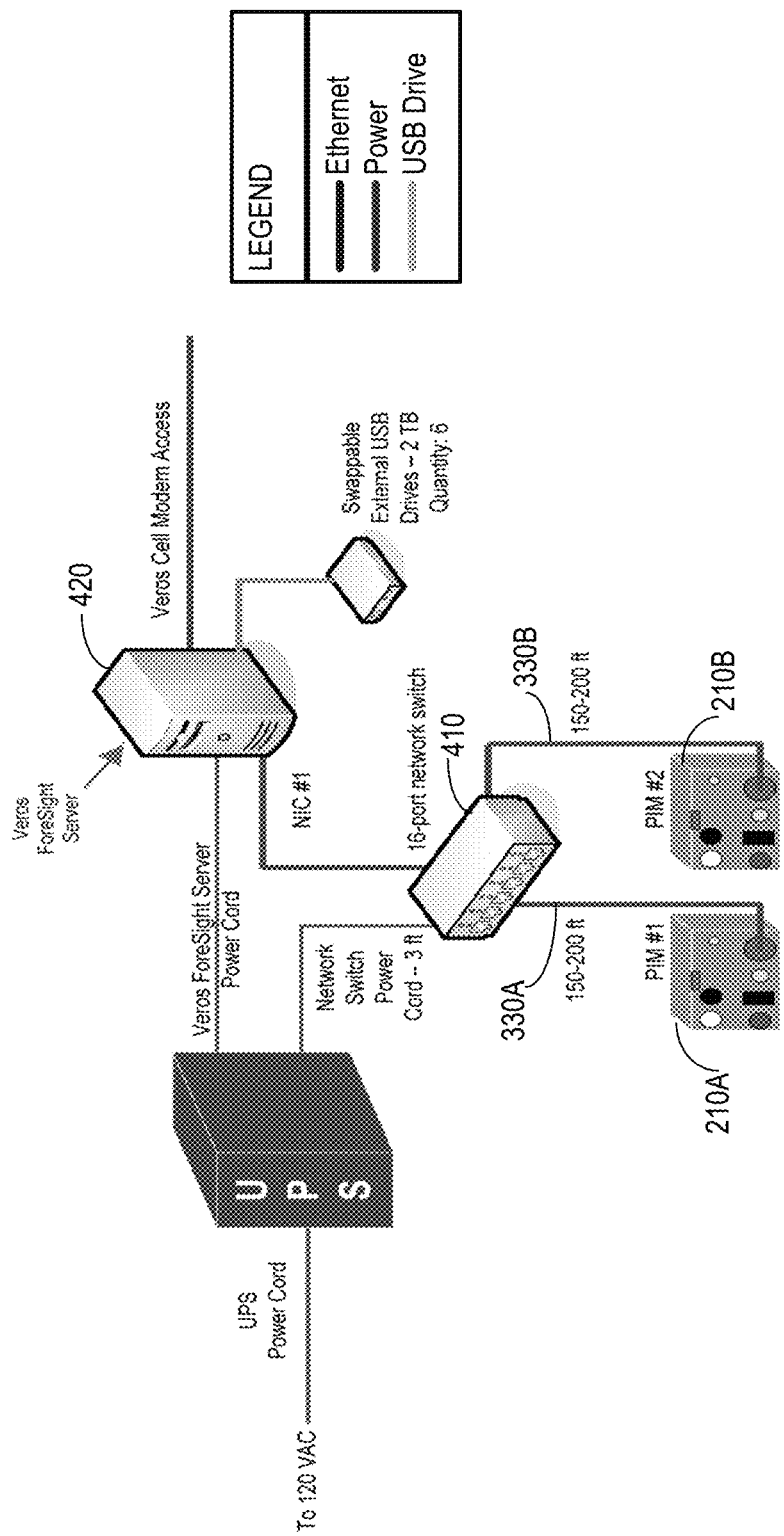
FIG. 4 illustrates an information network wiring schematic, according to embodiments of the present invention.

Referring to the schematic of FIG. 4, information network wiring is shown. The IT installation process included the following:

Connecting Ethernet cables 330A and B between PIMs 210 A and B and network switch 410 and wiring NIC #1 switch 410 to ForeSight EWM server 420, Connecting a cell modem and external drive to ForeSight EWM server, Connecting network switch 410 & ForeSight EWM server 420 to a UPS, and Powering up.

Once the electrical and IT devices and wiring was installed, motor nameplate information was entered into the ForeSight EWM system for each motor, the system was energized, and continuous sampling of waveform data began. The system commenced automated learning mode at startup and successfully began to monitor operation for each motor and its connected driver.

The following section describes new applications of the ForeSight™ EWM system for "sensorless" detection of reverse rotation and speed estimation of electric machines, according to one or more embodiments of the present invention. As previously mentioned, the ForeSight system is an electrical waveform monitoring (EWM) system offered by Veros Systems, Inc., that provides real-time metering information and has powerful predictive capabilities for detecting both mechanical and electrical failure modes of electric machines, including drivers (motors) and driven loads (pumps, fans compressors, etc.). Inputs to the ForeSight system are high frequency measurements of the three phases of voltage and the three phases of current.

In a particular instance of a new application described immediately below, the machine is a motor such as motor 112 coupled by a shaft 114 to an offshore pump 116 for driving pump 116 when motor 112 is electrically energized, as illustrated in FIG. 1 described herein above. Embodiments of the present invention involve a recognition that during normal operation, when a motor such as motor 112 is energized, it rotates in an operational direction and thereby rotates its coupled pump 116 in the same operational direction, so that pump 116 propels fluid from the pump's inlet to the pump's outlet. ("Operational direction" may also be referred to herein as a "reference direction.") Reverse rotation incidents may arise due to a chain of causes. When motor 112 is electrically de-energized (also referred to as "shut down," "shut off," "unpowered" or "powered off"), it no longer drives pump 116. Nearby valve 118 connected to the pump's outlet would ideally prevent fluid backflow from piping 122 when motor 112 that drives pump 116 is powered down, however, valve 118 may not always seat properly. This may allow the fluid's pressure head at pump 116 outlet to force fluid to flow backward through pump 116 from outlet to inlet, which reverses the rotation of pump 116 and its coupled motor 112. This tends to be harmful if pump 116 relies, as is common, on rotation in the operational direction to force lubrication flow for certain internal bearings.

As described herein below, tests were performed on one of the five motors for which the ForeSight™ EWM system was installed. The tests determined the EWM system can be successfully applied in this new way to detect voltages induced by reverse spinning of the pump 116 motor 112 in the unpowered state acting as a generator in free rotation. (Such induced voltages are sometimes referred to as "back EMF.")

Figure 5:
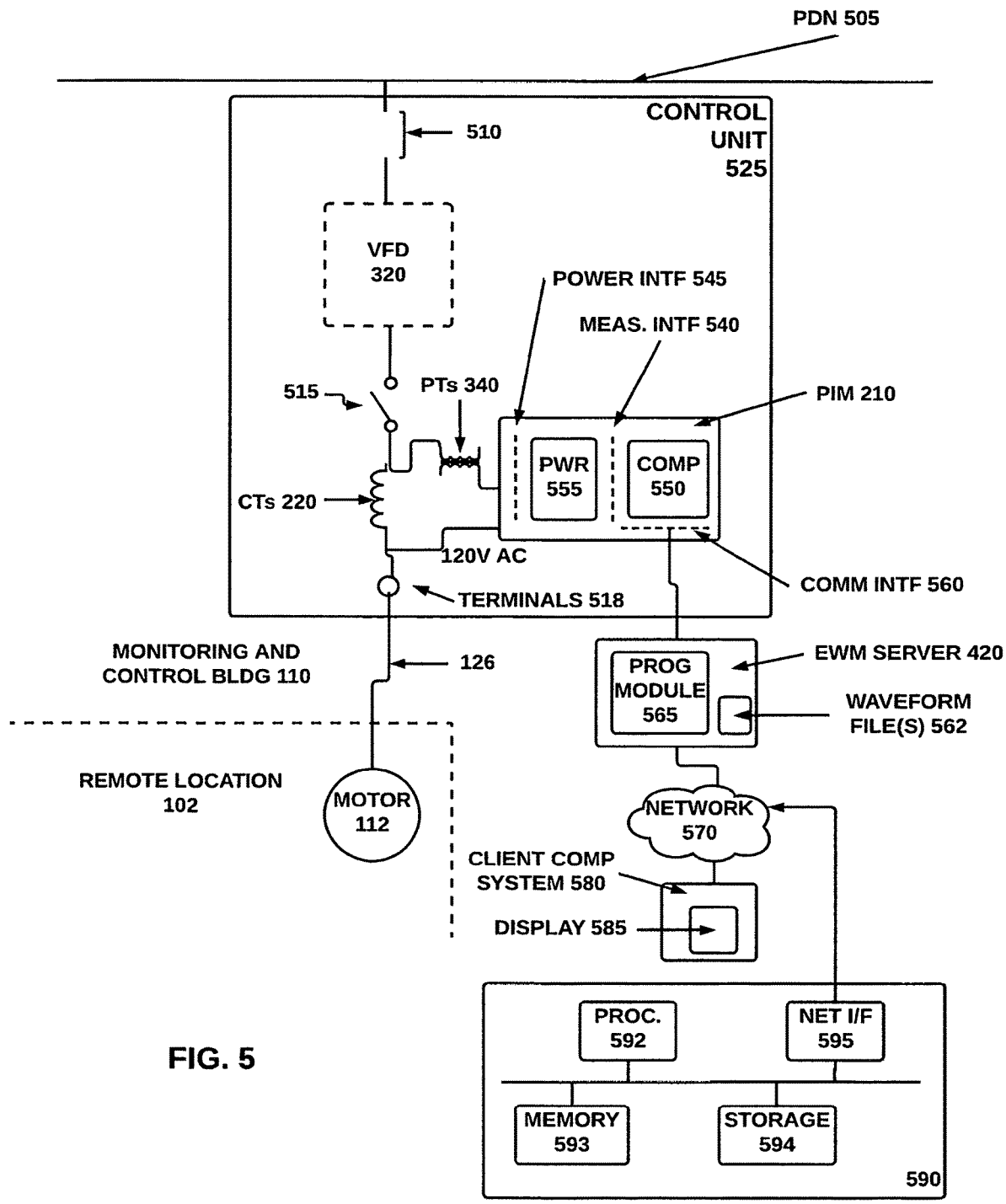
FIG. 5 illustrates an electrical schematic for detecting and presenting certain aspects of an electric machine's reverse rotation, according to embodiments of the present invention.

Referring now to FIG. 5, an electrical schematic of system 500 is shown for detecting and presenting certain aspects of an electric machine's reverse rotation, e.g., reverse rotation of the shaft of a de-energized electric machine, where the detecting is without physically accessing the machine, itself and without use of, e.g., signals from, any sensors on the machine, according to one or more embodiments of the present invention. In the illustrated embodiment, the machine is a motor 112 installed at a location 102 remote from a motor control unit 525, such as a switchgear or a motor control center cubicle, which is located in a monitoring and control building 110. Motor control unit 525 is for connecting a load to a PDN 505 bus. For the illustrated load, control unit 525 has a protective device 510 connected to PDN 505 on a line side and conductively coupled on the load side to a variable frequency drive 320 in line with a start/stop device, i.e., switch 515, such as a mechanical contactor, and terminals 520 connected to primary conductors 126 that feed electrical power to motor 112. Switch 515 is configured to energize motor 112 by closing the circuit from PDN 505 to terminals 520 and connected primary conductors 126, thereby supplying voltage and conducting current from PDN 505 power to motor 112. Switch 515 is configured to also de-energize motor 512 by opening the circuit, thereby interrupting the current and disconnecting the voltage from PDN 505 that would otherwise be supplied to motor 112.

For a motor, as shown in FIG. 5, supply conductors 126 supply power from PDN 505 to the motor 112. For a generator, supply conductors supply power from the generator to the PDN 505.

System 500 has a PIM 210 with a power PCB 555 configured for receiving power indicia from a power interface 545 and has a computing PCB 550 configured for receiving inputs from PCB 555 via a measurement interface 540. System 500 also has three-phase PT's 340 in motor control unit 525, with primary windings of PT's 340 coupled to primary leads 126 of motor 112. PT's 340 have secondary windings for communicating three-phase voltages of primary lines 126 to PIM 210. Specifically, the secondary windings are coupled to inputs of computing PCB 550 via power interface 545 for communicating the three-phase voltages as one set of the power indicia. Similarly, system 500 also has three-phase CT's 220 in motor control unit 525 for communicating three-phase currents of the motor's primary lines 126 to PIM 210. Specifically, the CT 220 windings are inductively coupled to primary leads 126 and hard wired to inputs of power PCB 555 via power interface 545.

Power PBC 555 is also configured for converting the analog input signals received from PT's 340 and CT's 220 to digital output signals received by computing PCB 550, which formats them for network communication. Specifically, communication interface PCB 560 of PCB 550 is coupled to server 420 via a connection including Ethernet cable 330. (This and others of the connections may be wireless in a different embodiment).

Server 420 has a program module 565 stored thereon that is configured for causing server 420 to perform actions described herein below, including detecting aspects of motor 112 reverse rotation. Server 420 is further configured to communicate via network 570 to a client computer 580 having a display, where client 580 is configured to present information about reverse rotation determined by program 565.

In the illustrated instance, waveforms measured via PT's 340 and CT's 220 are stored on computer readable storage media in one or more data structures 562, e.g., files in the illustrated instance, on the EWM server 420, but may be stored elsewhere that is accessible to program module 565, such as accessible via network 570 in cloud storage. The waveforms are of electrical power indicia including at least voltage for supply conductors configured for connecting the machine to the electrical PDN, e.g., voltage measured between switch 515 and conductor 126 terminals 518 in control unit 525.

The power indicia of stored waveforms 562 may also include current measured for supply conductors 126. Other data may also be associated with and stored in association with the waveforms, such as power indicia and associated time stamps for a control signal for opening and closing switch 515, which indicates whether switch 515 is open or closed and thereby indicates times when the motor is de-energized or energized.

Each waveform may be stored as a time series, which includes measured samples of the waveform's respective power indicia and a time stamp for each sample. In an embodiment, for example, the samples for the waveforms are measured at a frequency of at least twice the minimum required by the Nyquist sampling theorem for capturing the waveform fundamental frequency.

It should be understood that "rotation of the machine" herein refers to rotation of the machine's rotor and shaft. A motor has secondary windings on its rotor that is connected to a shaft of the motor for driving a load, such as a pump, for example. The motor has primary windings on a stator. The primary windings are electrically connected to primary leads for delivering electrical power to the primary windings, so currents in the primary windings generate an electric field that induces rotation of the rotor, thereby inducing rotation in the motor's shaft. A generator has windings on its rotor that is connected to a shaft for being driven by a prime mover, such as a turbine, for example. The generator also has windings on a stator, which are electrically connected to primary leads to deliver electrical power to a network, for example. By the prime mover driving rotation of the generator's rotor, currents in the rotor winding induce an electric field that causes its stator windings to deliver the electrical power to the network.

FIG. 5 also illustrates a computer system 590 suitable for EWM server 420 or for other computer systems in embodiments of the present invention. In embodiments, system 590 may include one or more adapter in communication with interconnect 596 and one or more respective output device, such as a display, printer, etc. for presenting output such as described and illustrated herein. System 590 includes at least one central processing unit (CPU) 592 (also referred to as a "processor"), network interface 595, interconnect (i.e., bus) 596, memory 593 and storage device 594. CPU 592 is configured to retrieve and execute programming instructions stored in memory 593. Similarly, CPU 592 may retrieve and store data residing in storage 594. Interconnect 596 may facilitate transmission, such as of programming instructions and application data, among CPU 592, storage594, network interface 595, and memory 593. CPU 592 is representative of a single CPU, multiple CPUs, a single CPU having multiple processing cores, and the like. Additionally, memory 593 is representative of a random-access memory, according to embodiments of the present invention. It should be understood that system 590 may be implemented by other hardware and that one or more modules thereof may be firmware.

Figure 6:
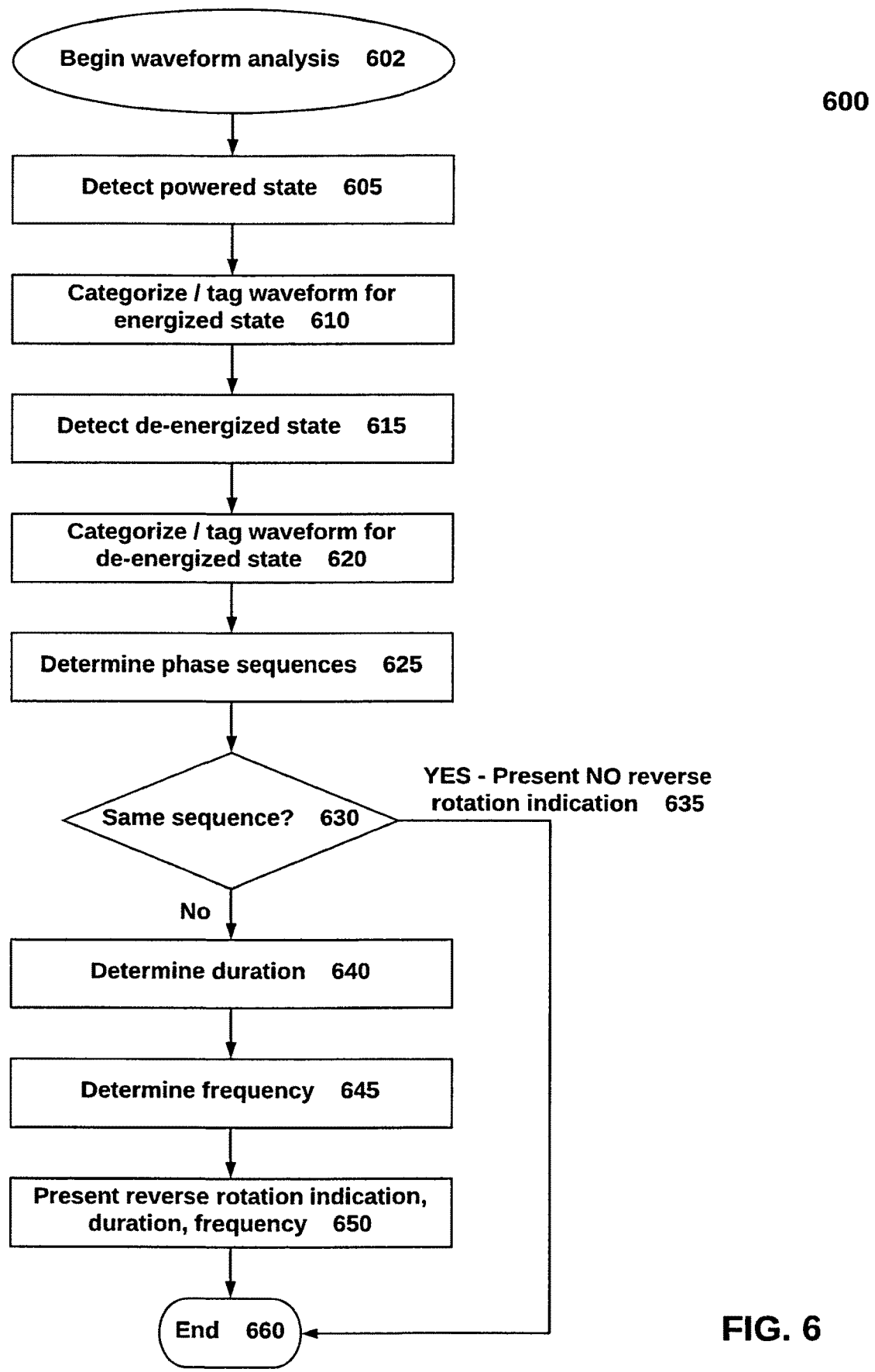
FIG. 6 illustrates a flow chart for determining rotation direction of a shaft of a de-energized electric machine without accessing the machine by analyzing previously collected waveforms for the machine, according to embodiments of the present invention.

Referring now to FIG. 6, a flow chart is shown to illustrate a process 600 for determining rotation direction of a shaft of a de-energized electric machine without accessing the machine by analyzing previously collected waveforms for the machine, according to one or more embodiments of the present invention. In an embodiment of the present invention, the term "waveform" refers to a multi-phase waveform, such as a three-phase waveform. For example, a voltage waveform includes voltages for the respective phases. In various embodiments, the waveforms may be phase to phase (also referred to as "line to line") or may be phase to ground.

In the description of FIG. 6, reference is made to "a module" and "the module." However, it should be understood that this is to provide a description that is easier to follow and does not imply that process 600 is necessarily performed by a single module. Without intending to limit the implementation of process 600, it may be noted that in various embodiments, aspects of process 600 are performed by one module and may, alternatively, be performed by more than one module, where the module(s) may be implemented as hardware, such as application specific integrated circuit(s) or implemented as program(s) executing on one or more computer systems, or a combination of both, for example. Such modules may be distributed among locations and devices/systems. Other embodiments of the present invention include a computer program product for performing aspects of the process 600. In one or more embodiments, the electric machine is a motor. In others, the electric machine is a generator.

For process 600 in at least one embodiment, there are sets of time-sampled, multi-phase waveforms, e.g., sequences of voltage and current samples at corresponding times, that have been collected and stored in a computer readable storage media by the ForeSight EWM system, where each waveform sample is tagged by the EWM system to indicate the time of each sample and to indicate the type of power indicia that each sample measures, voltage or current. According to process 600, a module begins at 602 analyzing the stored waveform samples, whereupon the module detects 605 when the machine was energized The module may be configured specifically for analyzing voltage and current waveforms measured on the machine's primary leads as illustrated in FIG. 5. (Voltage and current are each a type of "power indicia," as the term is used herein.) In such an embodiment, for example, the module may detect 605 time segments when the machine was in a powered state by detecting time segments during which the machine received current (where the machine is a motor). For a machine with no faults, this may be detected from the current waveform when a single one of the currents through the primary leads exceeds a predetermined threshold, for example. (Consequently, the current waveform may be limited to a single phase current in such an embodiment. However, the term "waveform" used herein may refer to a multi-phase waveform, as previously stated herein.) It may be preferable to detect that the machine is on by detecting that currents in all phases of the current waveform exceed a threshold. Without intending to limit the invention, a threshold may be 5% of full load amperes, for example. Other thresholds may be used.

In at least one other embodiment where the module is configured specifically for analyzing waveforms measured on the machine's primary leads, the module detects when the machine was in a powered state (for a machine with no faults) merely by detecting times when the voltage waveform includes at least one voltage exceeding a predetermined minimum average threshold voltage and without analyzing a current waveform, in which case the current waveform is not needed for detecting reverse rotation. When using voltage to detect the on state, it may be preferable to detect that the machine is on by detecting that all phases of the voltage waveform exceed a threshold. Without intending to limit the invention, a threshold may be 5% of rated voltage, for example. Other thresholds may be used.

In at least one embodiment where the machine has no faults and is not powered by a variable frequency drive, but rather is powered by a constant 60 Hz supply, for example, the module may be configured to detect when the machine was in a powered state by detecting times when at least one of the phases of one of the waveforms has a substantially constant frequency, e.g., 60 Hz within +/−1%. (Other ranges may be used.) For a machine supplied at a constant frequency, when using frequency to detect the energized state it may be preferable to detect that the machine is on by detecting that more than one of the phases has a substantially constant frequency. For a machine supplied by a variable frequency drive, when using frequency to detect the energized state, the module may be configured to detect that the machine is on by detecting that at least one, and preferably more than one, of the phases has a substantially constant frequency above a certain frequency threshold, in an embodiment.

Alternatively, in one or more embodiments the module may detect the machine was powered on and off some way other than power indicia derived from the waveforms, such as by monitoring control signal(s) that cause a motor control switch to connect and disconnect the branch circuit conductors of the machine, i.e., primary leads, from the power distribution network. (Such a control signal provides yet another type of power indicia.) The module may categorize collected waveforms as corresponding to an energized machine state according to the waveform time samples that correspond to the times when the control signal indicates the machine is energized.

According to an embodiment, responsive to detecting 605 times when the electric machine was in a powered state, the module categorizes 610, as first waveforms for the machine, those waveforms collected during the on state. The categorization 610 may include tagging the samples to indicate they are for a powered-on state of the machine.

Likewise, the module also analyzes the collected waveforms to detect 615 times when the machine is de-energized. The module may detect this in ways that are converse to that described herein above for detecting that the machine is energized, such as from the current waveform when a single one of the currents through a respective one of the primary leads is zero or falls below a predetermined threshold, for example, or when at least one voltage is below a predetermined minimum average threshold voltage and without analyzing a current waveform, or (for a machine supplied at a constant frequency) when at least one of the phases of one of the waveforms does not have a substantially constant frequency. As for detecting an energized state, it may be preferable to analyze more than one phase current, voltage or frequency to detect the de-energized state. For a machine supplied by a variable frequency drive, when using frequency to detect the energized state, the module may be configured to detect that the machine is off by detecting that at least one, and preferably more than one, of the phases does not have a substantially constant frequency above a certain frequency threshold, in an embodiment.

According to an embodiment, responsive to detecting 615 times when the electric machine was in a de-energized state, the module categorizes 620, as second waveforms for the machine, those waveforms collected for the machine during the off state, such as previously stated, e.g., waveform time samples for time segments during which the waveforms do NOT have a substantially constant frequency. The categorizing 620 may include tagging the samples to indicate the samples are for a powered off state of the machine.

As previously stated, when the machine is energized, a shaft of the machine rotates in a predetermined, operational direction. (For example, when the machine is a motor and the motor drives a pump, the operational direction of the motor is a direction necessary for proper pump rotation to force fluid flow.) As also previously stated, second waveforms were measured for the electric machine when it was not powered. In this unpowered state, the power distribution network is disconnected from the conductors to the machine, such as by a mechanical motor control switch in an open circuit condition, so that voltages on the primary leads arise not from the power distribution network, but from so-called "back EMF," i.e., voltages induced on the primary leads by rotation of the machine's rotor. Once in the unpowered state, the shaft of the machine may or may not have rotated in a direction that is reverse to the operational direction, as previously explained. The module may determine whether reverse rotation occurred.

Specifically, the module determines whether reverse rotation occurred, according to an embodiment, by first determining 625:
- a first phase sequence of the first waveforms, which correspond to when the machine was powered, e.g., a sequence of three-phase voltages impressed by the PDN on the energized primary leads, and
- a second phase sequence of the second waveforms, which correspond to when the machine is not powered, e.g., a sequence of three-phase voltages generated on the de-energized primary leads by back EMF.

Having determined 625 the first and second phase sequences, the module compares 630 the sequences. In response to determining at 630 that the first and second phase sequences are the same, the module branches to present 635 a message indicating there was no reverse rotation and then ends 660.

It should be appreciated, particularly given the test results presented herein below, that when the shaft rotated in the reverse direction, the duration of reverse rotation corresponded to a duration for which the second phase sequence differed from the first phase sequence. Likewise, it should be appreciated, particularly given the test results presented herein below, that a frequency or range of frequencies at which the shaft rotated in reverse may be determined by the oscillations of the second waveforms when the second phase sequence differs from the first sequence.

Accordingly, the module may determine at 630 that reverse rotation did occur during the time segment of the second waveform by determining that the first and second phase sequences are not the same. In such an instance, the module branches to determine 640 duration of the reverse rotation time segment, as explained herein below. Then the module determines 645 frequencies of the reverse rotation, particularly including a maximum frequency in at least one embodiment, but also including frequency versus time for the duration of the reverse rotation in at least one embodiment. Then the module presents 650 information to a user indicating the reverse rotation event, the duration of the reverse rotation and the reverse rotation frequencies.

As in the powered state, the power indicia in the unpowered state may include voltages or currents on the conductors to the machine, or both, which may be measured directly or may be measured indirectly, such as via instrument transformers. The figures herein that show test results illustrate that voltage waveforms were measured for comparisons of phase sequences in the powered and unpowered states. In at least one respect for motors, it is generally preferred to include voltage measurements of the motor conductors (i.e., primary leads), particularly for the unpowered state. Indeed, no current flows for an open circuit switch that disconnects the motor from the power distribution system to de-energize the motor, in which case voltage measurements are particularly needed for the primary leads.

Waveforms that correspond to times when the machine is in both the powered state and the de-energized state may be measured and collected by a PIM of the EWM system on the side of the control switch that connects to the machine conductors. However, the electric machine's "powered state" is a special case. This state arises when a PDN is connected to the machine in a conductive path through a closed switch, e.g., mechanical starter (or, alternatively, through a solid-state switch in a low impedance state) that connects the PDN to branch circuit conductors of the machine, which are connected to the machine's primary leads and, hence, may be referred to, themselves, as primary leads, as previously explained. For a motor, for example, in the special case of the powered state, multi-phase voltages and currents to the motor are in the same phase sequence as those on the bus of the PDN that feeds the motor's primary leads. Accordingly, waveforms that correspond to times when the machine is in the powered state may, alternatively, be measured and collected by a PIM of the EWM system on the power distribution bus side of a control switch that energizes and de-energized the motor, i.e., instead of on the side of the control switch connected to conductors to the machine.

Regardless of whether a machine is a motor or a generator, terms such as "powered," "energized" and the like that are used herein refer to a state where the machine is conductively connected to a PDN, which conventionally includes a power distribution bus. When the electric machine is a motor, the powered state of the machine arises when a PDN energizes the motor in a path through a closed switch, e.g., mechanical starter (or, alternatively, through a solid-state switch in a high impedance state) that connects the PDN to branch circuit conductors of the motor (primary leads). When the machine is a generator, the machine generates power and may energize the PDN when connected and driven by a prime mover.

Figure 7:
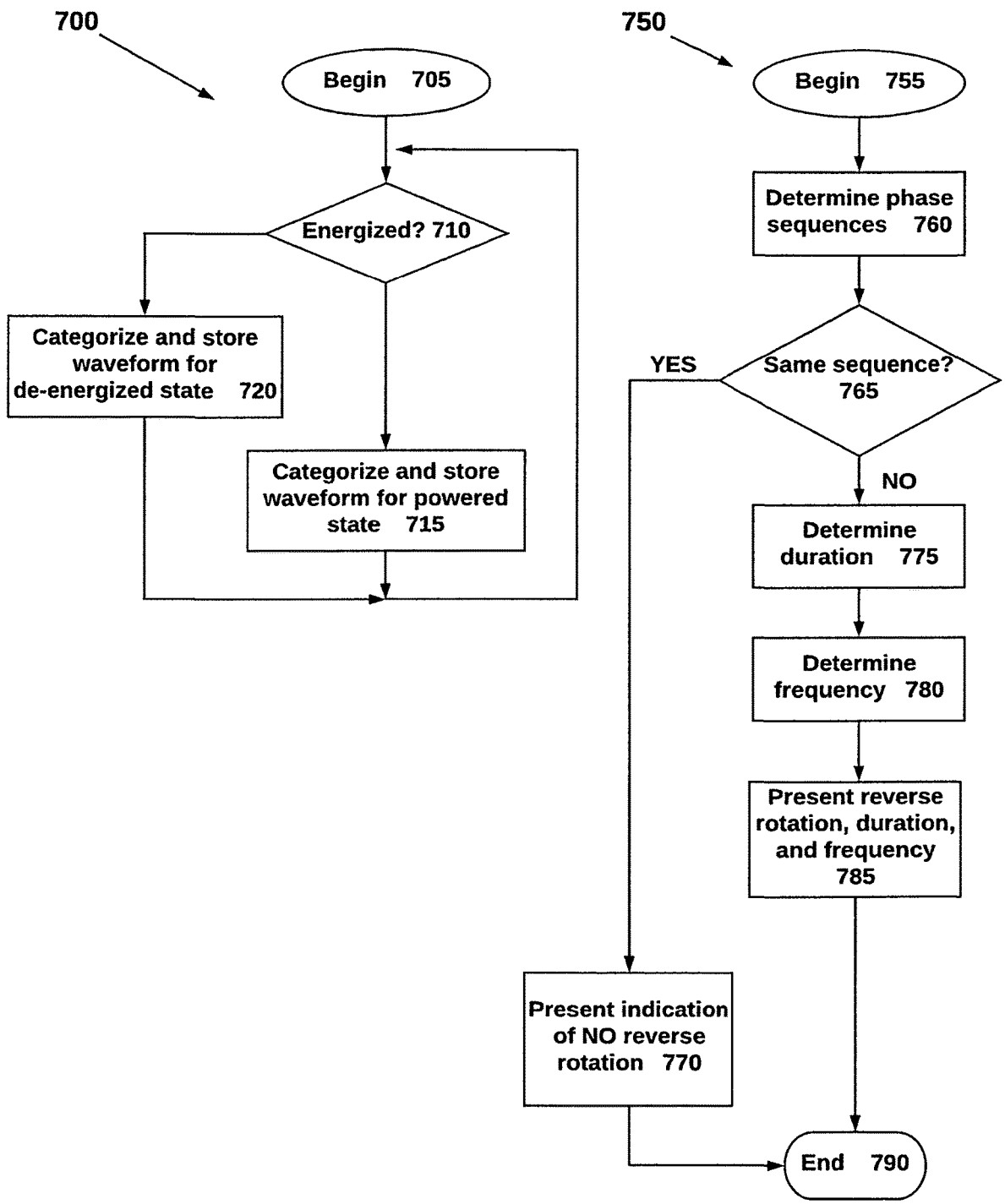
FIG. 7 depicts a flow chart illustrating processes for determining rotation direction of a shaft of a de-energized electric machine in real time operation without accessing the machine by collecting and concurrently analyzing waveforms for the machine, according embodiments of the present invention.

Referring now to FIG. 7, a flow chart is shown to illustrate processes 700 and 750 for determining rotation direction of a shaft of a de-energized electric machine in real time operation without accessing the machine by collecting and concurrently analyzing waveforms for the machine, according to one or more embodiments of the present invention. In the description of FIG. 7, as in FIG. 6, reference is made to "a module" and "the module." However, it should be understood that this is to provide a description that is easier to follow and does not imply that processes 700 and 750 are necessarily performed by a single module. Without intending to limit the implementation of processes 700 and 750, it may be noted that in various embodiments, aspects of the process are performed by one module and may, alternatively, be performed by more than one module, where the module(s) may be implemented as hardware, such as application specific integrated circuit(s) or implemented as program(s) executing on one or more computer systems, or a combination of both, for example. Such modules may be distributed among locations and devices/systems. Other embodiments of the present invention include a computer program product for performing aspects of the processes 700 and 750. In one or more embodiments, the electric machine is a motor. In others, the electric machine is a generator.

For process 700 in at least one embodiment, sets of time-sampled waveforms, e.g., sequences of voltage and current samples at corresponding times, are collected and stored in a computer readable storage media by the ForeSight EWM system, where each waveform sample is tagged by the EWM system to indicate the time of each sample and to indicate the parameter that each sample measures, e.g., voltage or current. According to process 700, a module begins at 705 analyzing waveforms as they are time sampled, wherein the module detects at 710 whether the machine is energized when each waveform sample is collected. The module may, in an embodiment of the present invention, for example, detect the machine is currently energized by detecting the current and most recently measured waveform samples indicate the current waveforms have a substantially constant frequency, e.g., 60 Hz within +/−1%.

The module may be initially configured specifically for analyzing waveforms measured on the machine's primary leads, and the module may alternatively detect 710 when sampling that the machine is in a powered state by detecting the currently sampled waveforms include voltages exceeding a predetermined minimum threshold voltage. In at least one embodiment when the module is initially configured specifically for analyzing waveforms measured on the machine's primary leads, the module detects 710 the machine is in a powered state by detecting the currently sampled waveforms include currents through the primary leads exceeding a predetermined threshold, for example.

Alternatively, in one or more embodiments the module may detect whether the machine is powered on and off some way other than power indicia of the waveforms, such as by monitoring control signal(s) that cause a motor control switch to connect and disconnect the branch circuit conductors of the machine, i.e., primary leads, from the power distribution network. The module may categorize collected waveforms as corresponding to an energized machine state according to the waveform time samples that correspond to the times when the control signal indicates the machine is energized.

According to an embodiment, responsive to detecting 710 the electric machine is in a powered state, the module categorizes 715 the current waveforms collected during the on state as first waveforms, such as waveforms sampled while they have a substantially constant frequency, e.g., 60 Hz within +/−1%, for example, or in the other ways described herein above. Categorization 710 may include tagging the first waveform samples to indicate they are for the powered-on state of the machine.

According to an embodiment, responsive to detecting 710 the electric machine is not in a powered state, the module categorizes 720 the current waveforms collected during the off state as second waveforms, such as waveforms sampled while they do not have a substantially constant frequency, e.g., not a 60 Hz frequency within +/−1%, for example, or in the other ways described herein above. The categorizing 720 may include tagging the second waveform samples to indicate they are for the powered-off state of the machine.

In process 750, upon beginning at 755, the module determines whether reverse rotation occurred, according to an embodiment, by first determining 760:

a first phase sequence of the first waveforms, which correspond to when the machine was powered, e.g., a sequence of three-phase voltages impressed on energized primary leads, and a second phase sequence of the second waveforms, which correspond to when the machine is not powered, e.g., a sequence of three-phase voltages generated by back EMF on de-energized primary leads.

Having determined 760 the first and second phase sequences, the module compares 765 the sequences. In response to determining at 765 that the first and second phase sequences are the same, the module branches to present 770 a message indicating there was no reverse rotation and then ends 790.

The module may determine at 765 that reverse rotation did occur during the time segment of the second waveform by determining that the first and second phase sequences are not the same. In such an instance, the module branches to determine 775 duration of the reverse rotation time segment, as explained herein below. Then the module determines 780 frequencies of the reverse rotation, particularly including a maximum frequency in at least one embodiment, but also including frequency versus time for the duration of the reverse rotation in at least one embodiment. Then the module presents 785 information to a user indicating the reverse rotation event, the duration of the reverse rotation and the reverse rotation frequencies and then ends at 790.

The following presents results in instances of testing the ForeSight™ EWM system for detecting reverse rotation, etc., in connection with some motor shutdown events of a two-pole induction motor. This includes presenting time domain data showing voltage phase sequence changes that objectively indicated reverse rotation of the motor after certain of the shutdown events. Specifically, in a shutdown of the tested machine on 20 Sep. 2016, a lengthy reverse rotation event occurred and is shown by data presented herein. A separate shutdown occurred on 8 Oct. 2016 in which limited reverse rotation was indicated. A third shutdown occurred on 18 Nov. 2016 in which there was no evidence of reverse flow. In the particular instances described, conventional instrumentation indicated that the valve might not have always sealed properly when the motor driver was shut down, so that backflow through the unit might have been occurring. Even if backflow was occurring, however, it was not known whether backflow was causing the pump to rotate in reverse and potentially cause damage.

Besides presenting evidence objectively confirming the suspected reverse rotation, time domain data shown here also provide details regarding dynamics of the reverse rotation, which were previously unknown. Notably, the data show instances of previously undetected, dramatic acceleration occurring when the electric motor first began to reverse its spin. Finally, changes in duration and rpm of the unit's reverse rotation are summarized in this section for nine different shutdown events over two months.

Regarding the testing of the ForeSight™ EWM system for detecting reverse rotation, etc., it was reported that there had been 10 downtime periods since the startup of this newly-installed unit, as shown in the following table:

| Shutdown # | Approx. start of the shutdown | Backflow Suspected? |
| --- | --- | --- |
| 1 | Sep. 20, 2016 between 12:30-13:00 hrs | Yes |
| 2 | Sep. 20, 2016 at approx. 22:20 hrs | No |
| 3 | Sep. 26, 2016 at approx. 07:30 hrs | No |
| 4 | Oct. 8, 2016 at approx. 08:35 hrs | No |
| 5 | Oct. 10, 2016 at approx. 02:25 hrs | No |
| 6 | Oct. 12, 2016 at approx. 21:40 hrs | No |
| 7 | Oct. 24, 2016 at approx. 14:45 hrs* | No |
| 8 | Nov. 14, 2016 at approx. 06:20 hrs | No |
| 9 | Nov. 18, 2016 at approx. 22:15 hrs | No |
| 10 | Nov. 20, 2016 at approx. 21:20 hrs | No |

*some data missing from this shutdown due to power outage

Long Duration Backflow Event on 20 Sep. 2016

The measurements most relevant to post shutdown analysis in the reported instances are three phase voltage waveforms. In the installation of the subject motor, the measured voltages are step-down instrument transformer secondary waveforms, proportional to the phase-to-phase (or line-to-line) voltages. No direct primary waveforms or ground referenced voltages were available.

Figure 8:
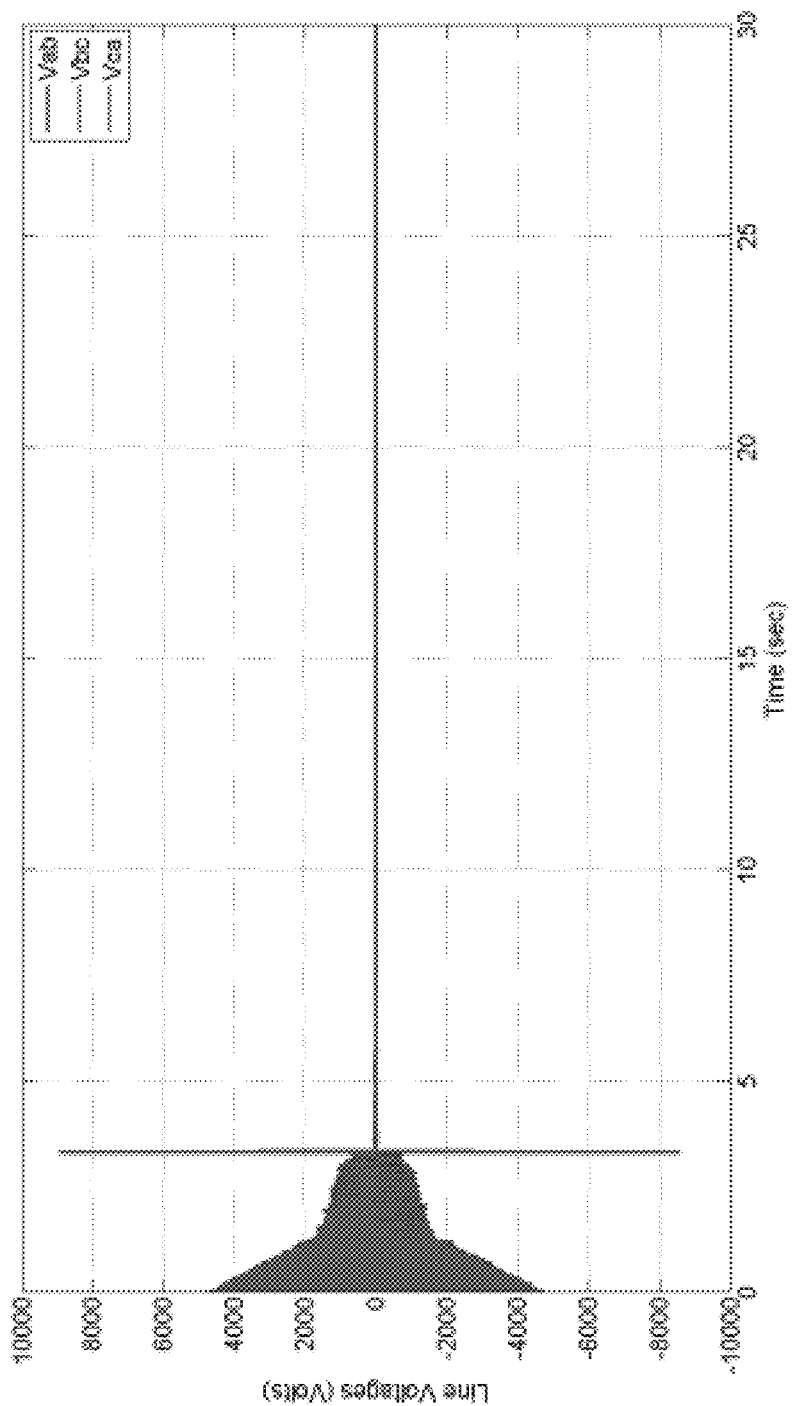
FIG. 8 shows three phase voltage waveforms measured during operation, according to embodiments of the present invention.

FIG. 8 shows the three phase voltage waveforms measured during operation, i.e., with the motor energized, and following the 20 Sep. 2016 shutdown event (Shutdown #1), i.e., with the motor de-energized, whereupon backflow was suspected due to measurements from process instrumentation other than the ForeSight waveform measurements.

Observations from FIG. 8:

The data set has a duration of 30 seconds;

The ramp down of the voltage had already begun at t=0 in this figure, indicating peak-to-peak voltages of +/−4,700V (normal operation is approx. +/−6,000V peak-peak, measured remotely at the VFD output);

There is a short but large voltage spike near the point in time (about t=3 seconds) where the voltage drops to zero (the magnitude of the spike is outside the ForeSight calibration range; the uncalibrated voltage spike has magnitude of approximately +/−9,000V).

Figure 9:
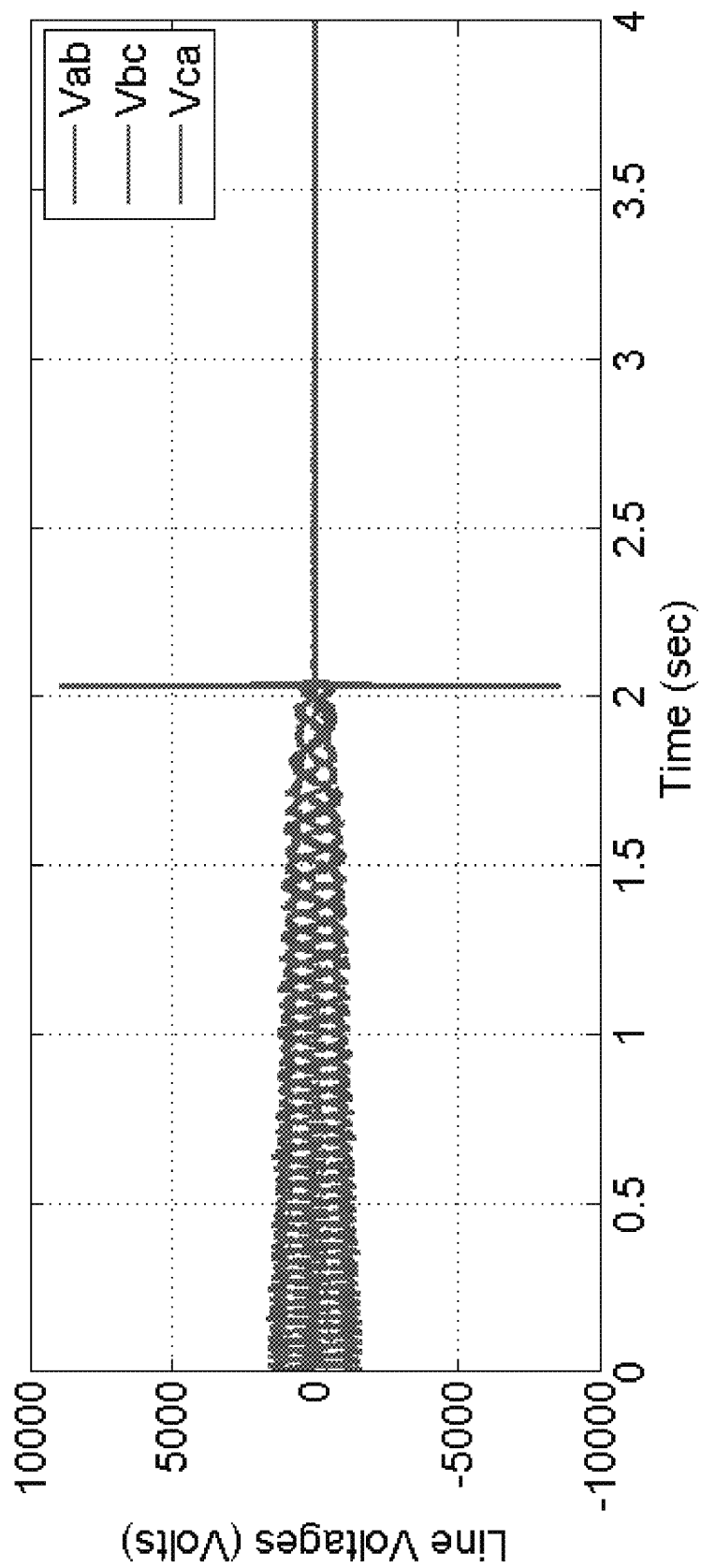
FIG. 9 illustrates a magnified version of FIG. 8 showing two seconds on either side of a zero-voltage time, according to embodiments of the present invention.

FIG. 9 provides a magnified version of FIG. 8 showing two seconds on either side of the zero-voltage time.

Observations from FIG. 9:

Data set contains approximately 2 sec before and after the voltages reach zero;

The large voltage spike coincides with, i.e., immediately follows, the time when the motor voltages reach zero (i.e., when the motor is de-energized) and is followed by some voltage activity, better seen in the next figure;

The normal electrical phase sequence for this electric machine is Blue→Green→Red, as seen before the large voltage spike.

Figure 10:
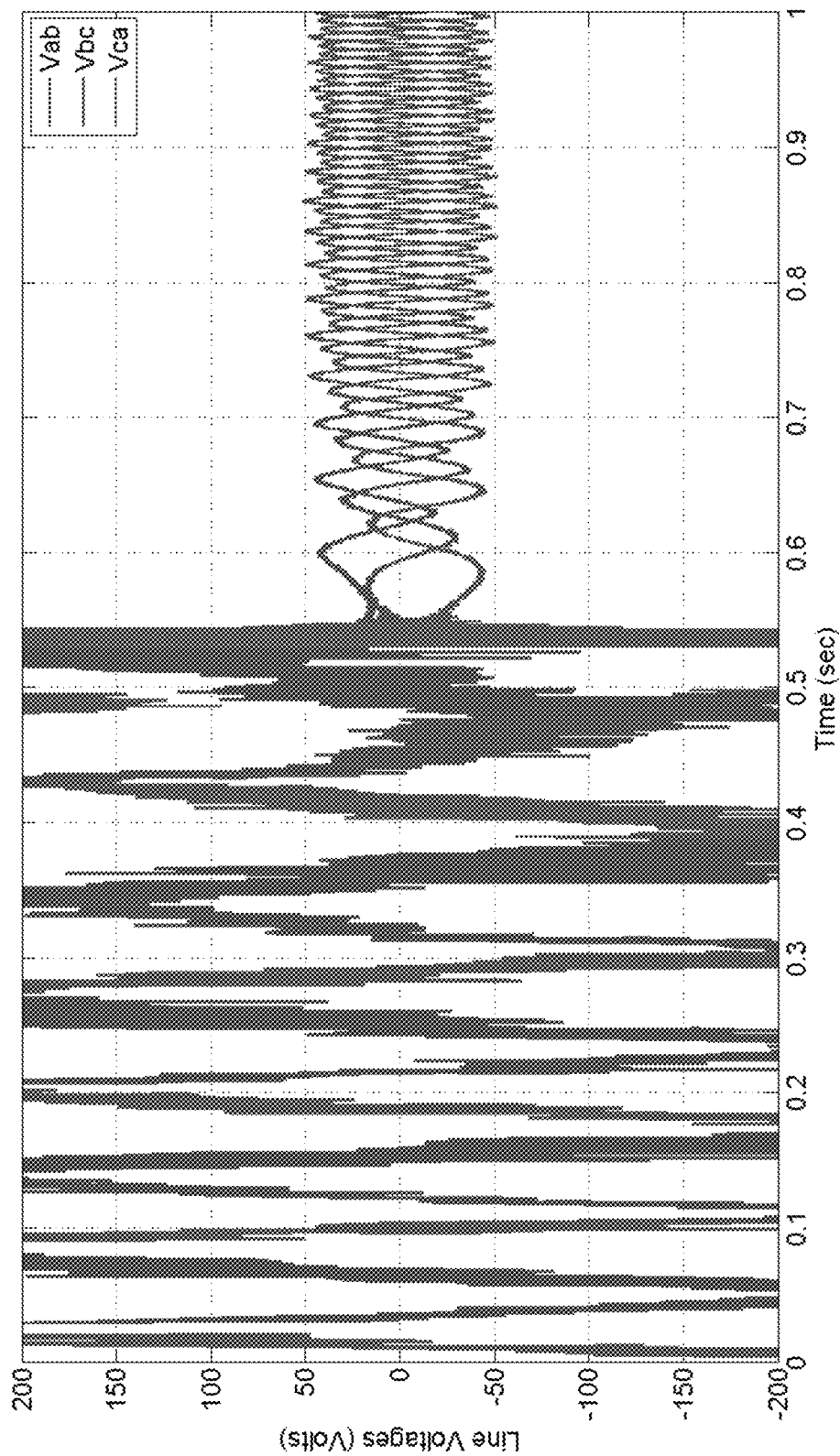
FIG. 10 illustrates further magnification of a time period adjacent to a large voltage spike in FIG. 9, according to embodiments of the present invention.

FIG. 10 shows further magnification of the time period adjacent to the large voltage spike in FIG. 9.

Observations from FIG. 10:

Change in voltage phase sequence is visible at t=0.6 sec. FIG. 4 provides further magnification of the interval 2 seconds after the voltage spike and shows the resulting voltage phase sequencing.

Figure 11:
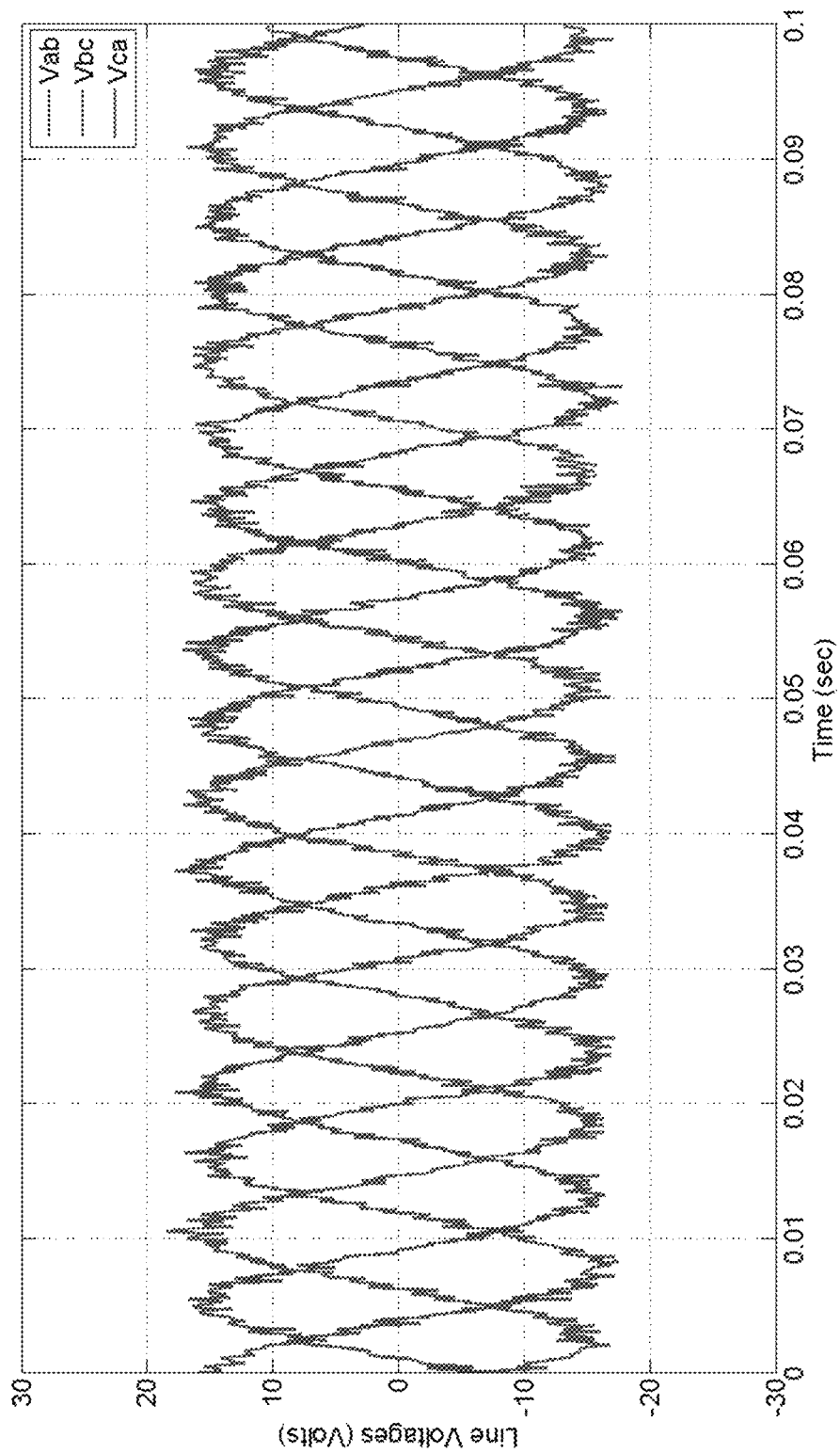
FIG. 11 shows further magnification of FIG. 10, starting 2 seconds after a voltage spike, according to embodiments of the present invention.

FIG. 11 shows further magnification of FIG. 10, starting 2 seconds after the voltage spike.

Observations from FIG. 11:

Voltages at this point are outside the calibration range of the ForeSight EWM system (the uncalibrated voltages are +/−15V);

Phase sequence is Blue→Red→Green, indicating phase sequence reversal from the normal Blue→Green→Red sequence. This observation is consistent with reversal in the direction of the electric machine's rotation following the large voltage spike;

Voltage frequency is at 62.5 Hz (period of 16 ms). For the 2-pole motor, which induces one voltage cycle on its branch circuit conductors for each rotation of its rotor, this 62.5 Hz voltage induced by the motor translates to a synchronous speed of about 3,750 rpm=(62.5 voltage cycles per second×60 seconds per minute)/(1 pole pair).

Figure 12:
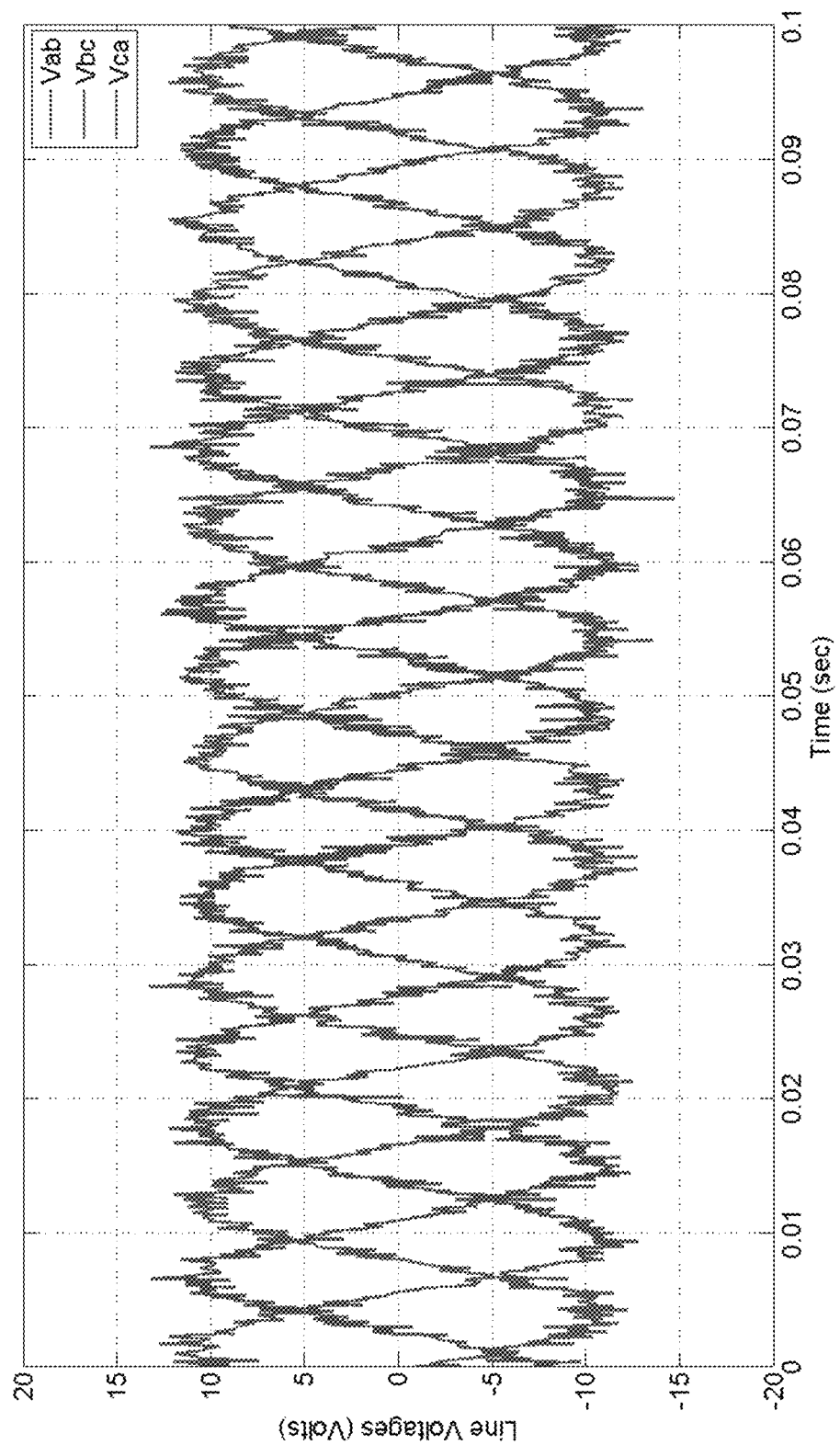
FIG. 12 shows voltage waveforms ten seconds after a large voltage spike showing lower voltage magnitudes and approximately 60 Hz voltage frequency, according to embodiments of the present invention.
Figure 13:
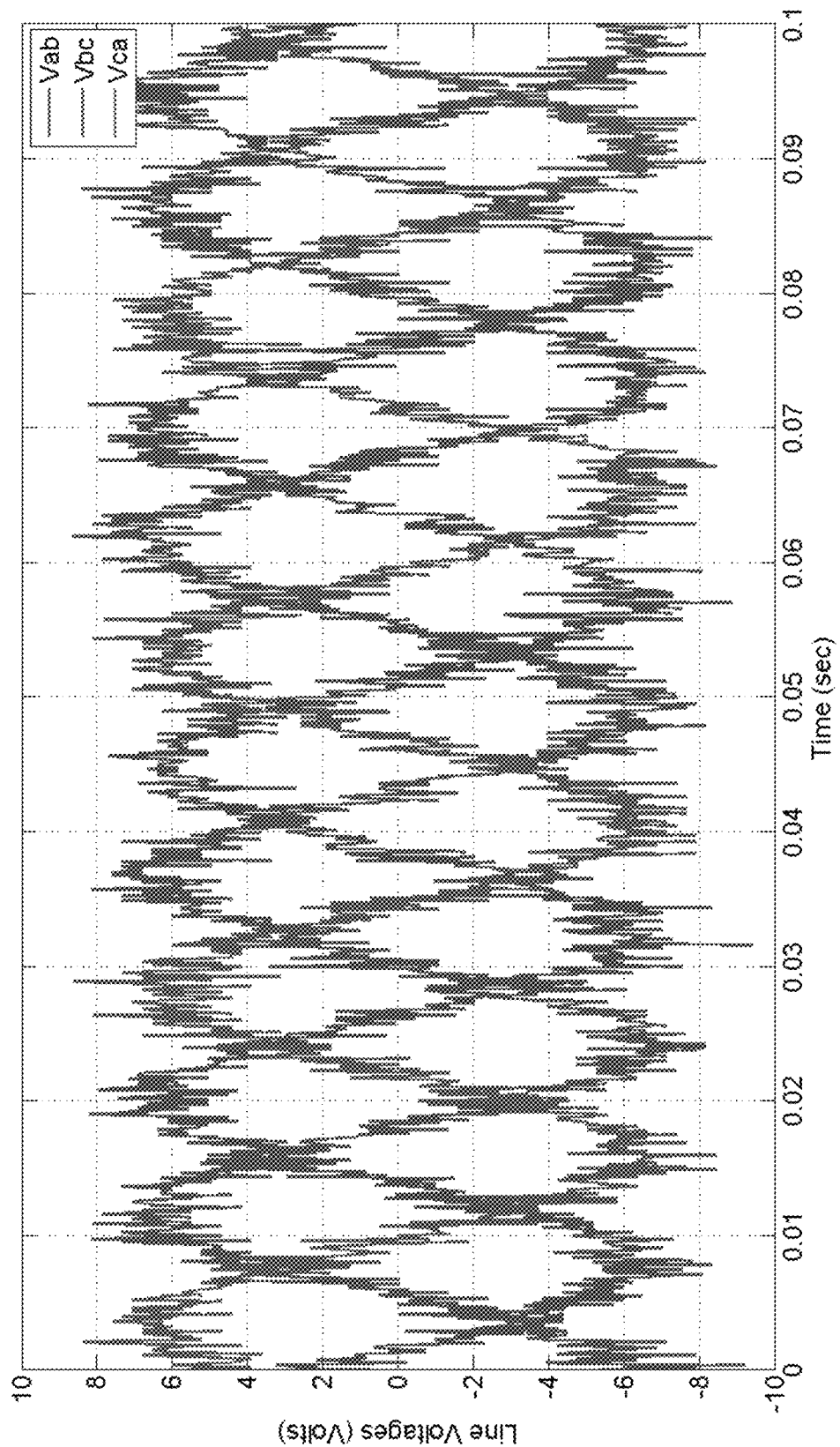
FIG. 13 shows voltage waveforms two minutes and twenty seconds after voltage spike showing even lower voltage magnitudes and approximately 40 Hz voltage frequency, according to embodiments of the present invention.
Figure 14:
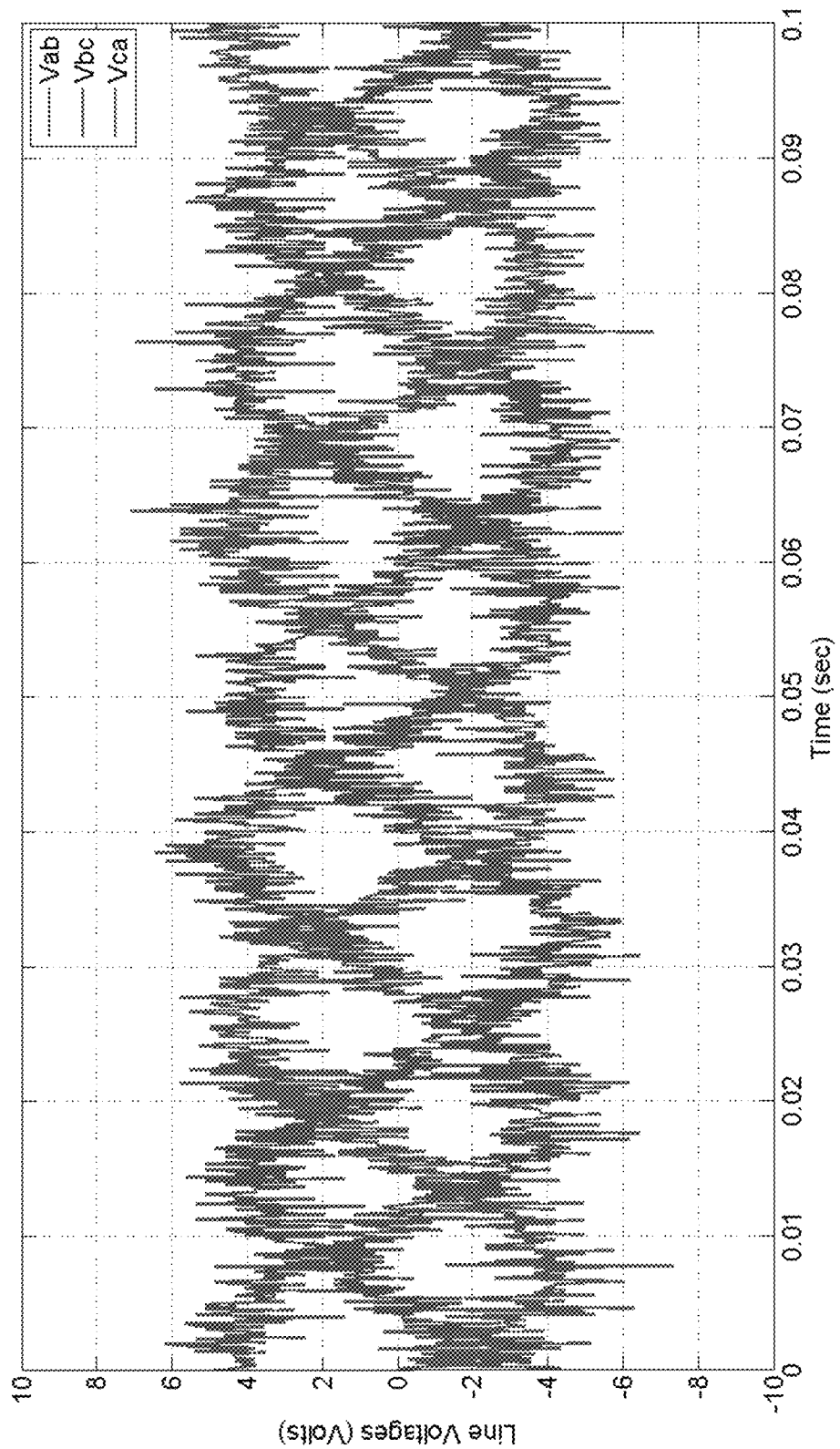
FIG. 14 shows voltage waveforms six minutes after a voltage spike, showing even lower voltage magnitudes and approximately 28 Hz voltage frequency, according to embodiments of the present invention.
Figure 15:
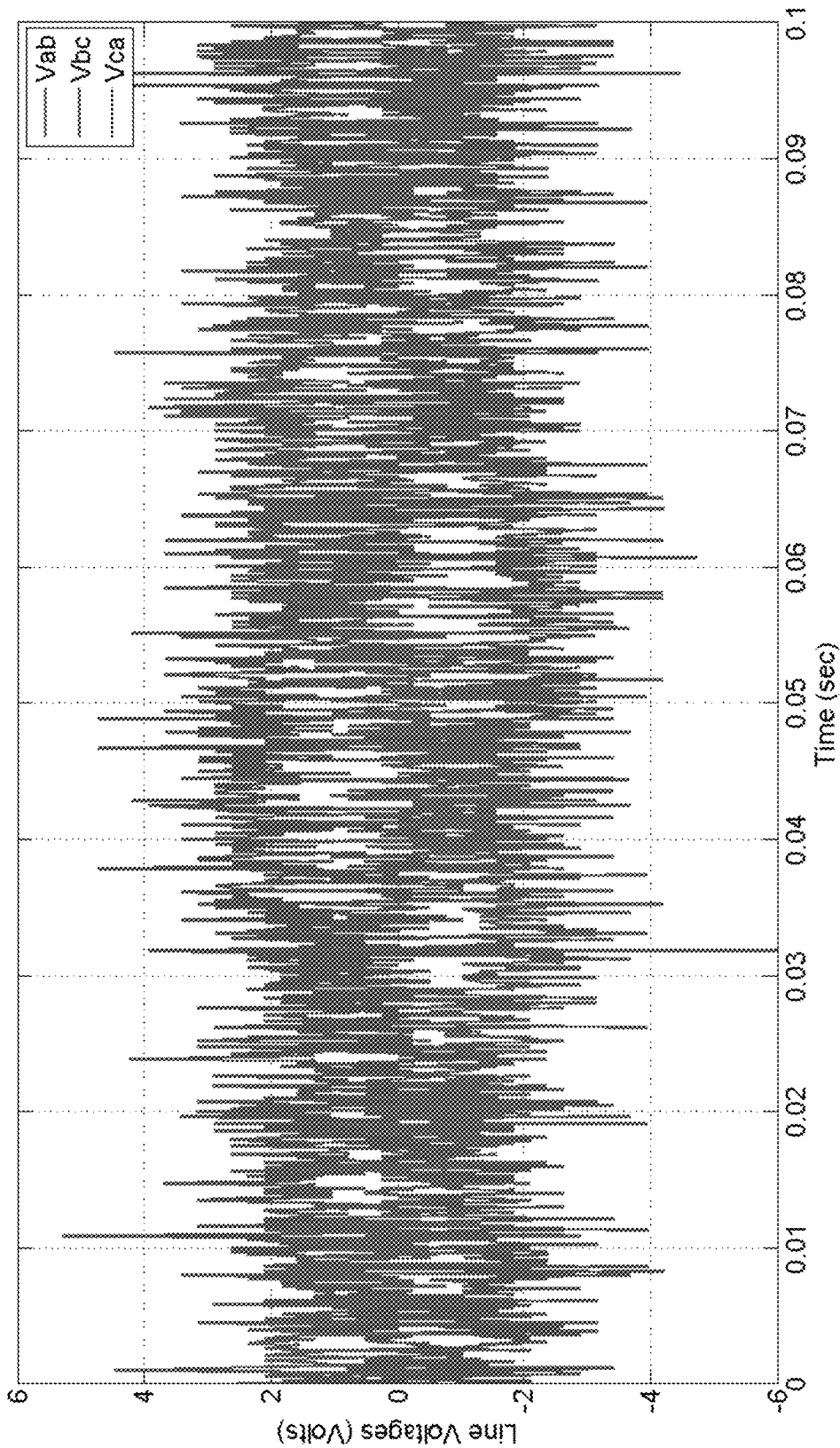
FIG. 15 shows voltage waveforms eight minutes and thirty seconds after a voltage spike showing very low voltage magnitudes and approximately 13 Hz voltage frequency, according to embodiments of the present invention.

The following sequence of four plots in FIGS. 12-15 depict the voltage waveforms in short duration segments following the large voltage spike seen in FIG. 9. The plots show the attenuation of voltage waveform magnitudes and the reduction in voltage frequency over time both consistent with a slowing down rotating asset generating potential difference across its terminals. Specifically, FIG. 12 shows voltage waveforms ten (10) seconds after the large voltage spike showing lower voltage magnitudes and approximately 60 Hz voltage frequency (or 3,600 rpm); FIG. 13 shows voltage waveforms two (2) minutes and twenty (20) seconds after voltage spike showing even lower voltage magnitudes and approximately 40 Hz voltage frequency (or 2,400 rpm); FIG. 14 shows voltage waveforms six (6) minutes after voltage spike showing even lower voltage magnitudes and approximately 28 Hz voltage frequency (or 1,700 rpm); and FIG. 15 shows voltage waveforms eight (8) minutes and thirty (30) seconds after voltage spike showing very low voltage magnitudes and approximately 13 Hz voltage frequency (or 800 rpm).

Figure 16:
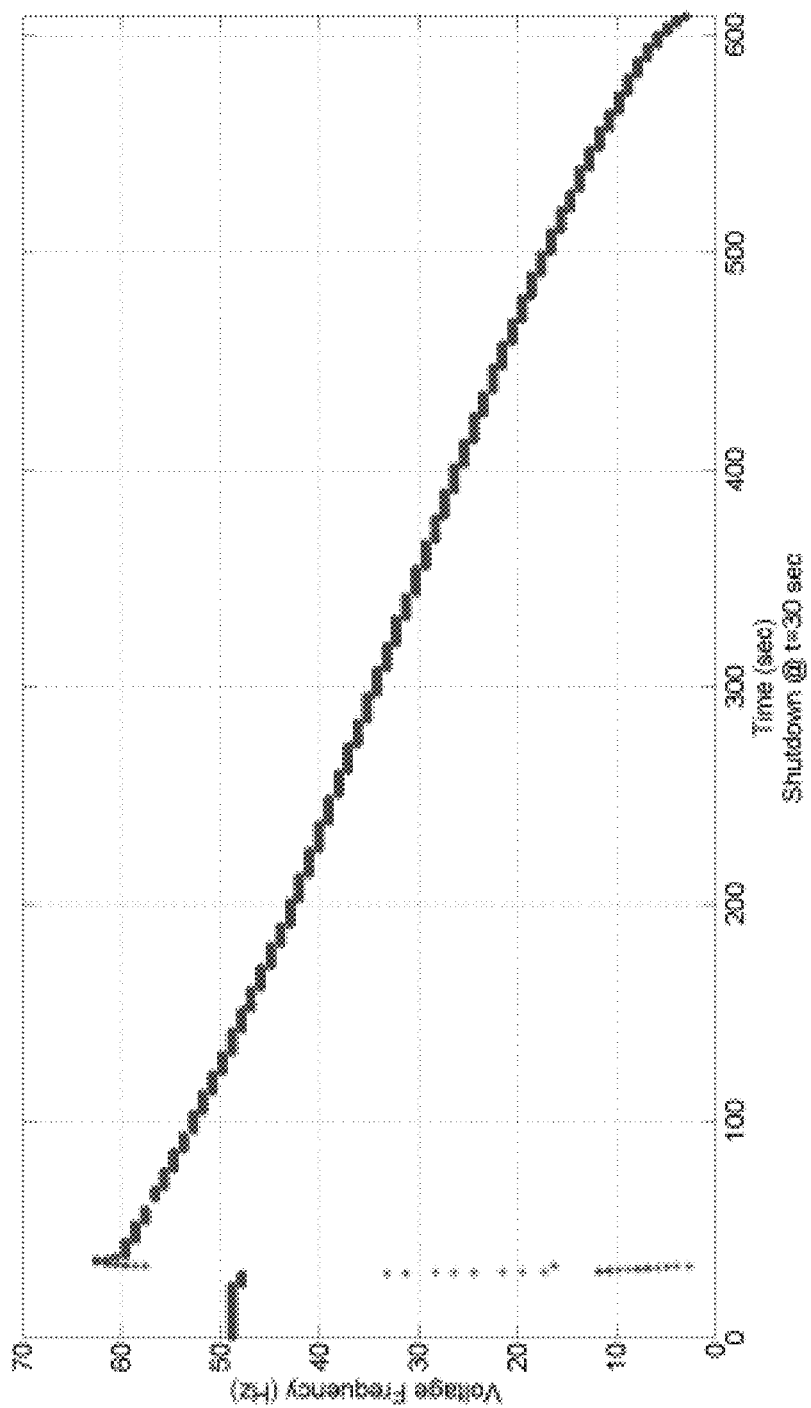
FIG. 16 shows a measured voltage frequency plotted over time for a shutdown, according to embodiments of the present invention.

FIG. 16 shows the measured voltage frequency plotted over time for the shutdown on 20 Sep. 2016. Voltage frequency is a direct proxy for the asset rotation speed. For time 0-30 seconds, the voltage frequency is 49 Hz, equivalent to an asset rotation speed of approximately 2,950 rpm. Frequency slows to 0 Hz (0 rpm) when power is interrupted to the unit. Frequency then accelerates rapidly in a reverse rotation, reaching 62.5 Hz (3,750 rpm) in less than a second, then decreases to 0 over 9.5 min.

Conclusions relating to 20 Sep. 2016 shutdown:

During the 20 Sep. 2016 shutdown event, the waveforms recorded by Veros ForeSight EWM system confirm a change in the electrical phase sequence of the voltages from the normal phase sequence, a fact which is consistent with reverse asset rotation compared to normal asset operation;

Prior to phase sequence change, a large voltage spike is recorded at the point of near zero voltages, a fact which is consistent with a sudden change in direction of rotational acceleration. The transition time between near zero rotation in the correct direction and high rotation in the reverse direction appears very short;

The duration of reverse rotation is estimated at about 9.5 minutes before voltage waveforms become comparable to background noise levels;

The corresponding reverse synchronous speed (in rpm) ranges from approximately 3,750 rpm, down to 800 rpm after about 8.5 minutes.

Short Duration Backflow Event on 8 Oct. 2016 (Shutdown #4)

Figure 17:
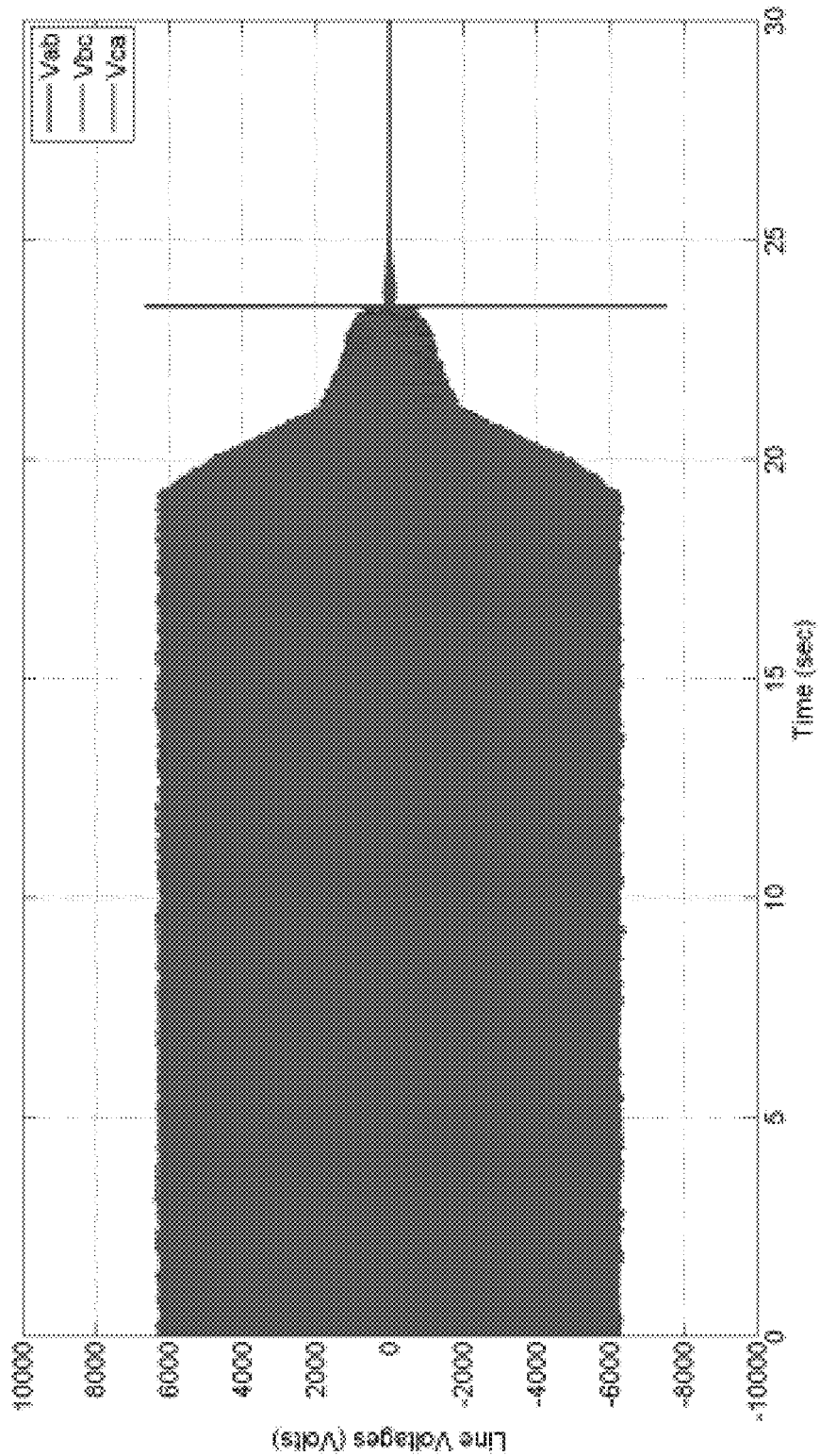
FIG. 17 shows three phase voltage waveforms from 23 seconds before until 7 seconds after a voltage spike for a shutdown event, according to embodiments of the present invention.

FIG. 17 shows three phase voltage waveforms from 23 seconds before until 7 seconds after a voltage spike for the 8 Oct. 2016 shutdown event. The customer had not suspected backflow for this event, based on measurements from the conventional, non-ForeSight EWM process instrumentation.

Observations from FIG. 17:

The data set has a duration of 30 seconds;

The ramp down of the voltage begins at t=19 sec in this figure, indicating peak-to-peak voltages of 6,000V, measured remotely at the VFD output;

There is a short but large voltage spike near the point in time where the voltage drops to zero (the magnitude of the spike is outside the ForeSight calibration range; the uncalibrated voltage spike has magnitude of approximately +/−6,800V).

Figure 18:
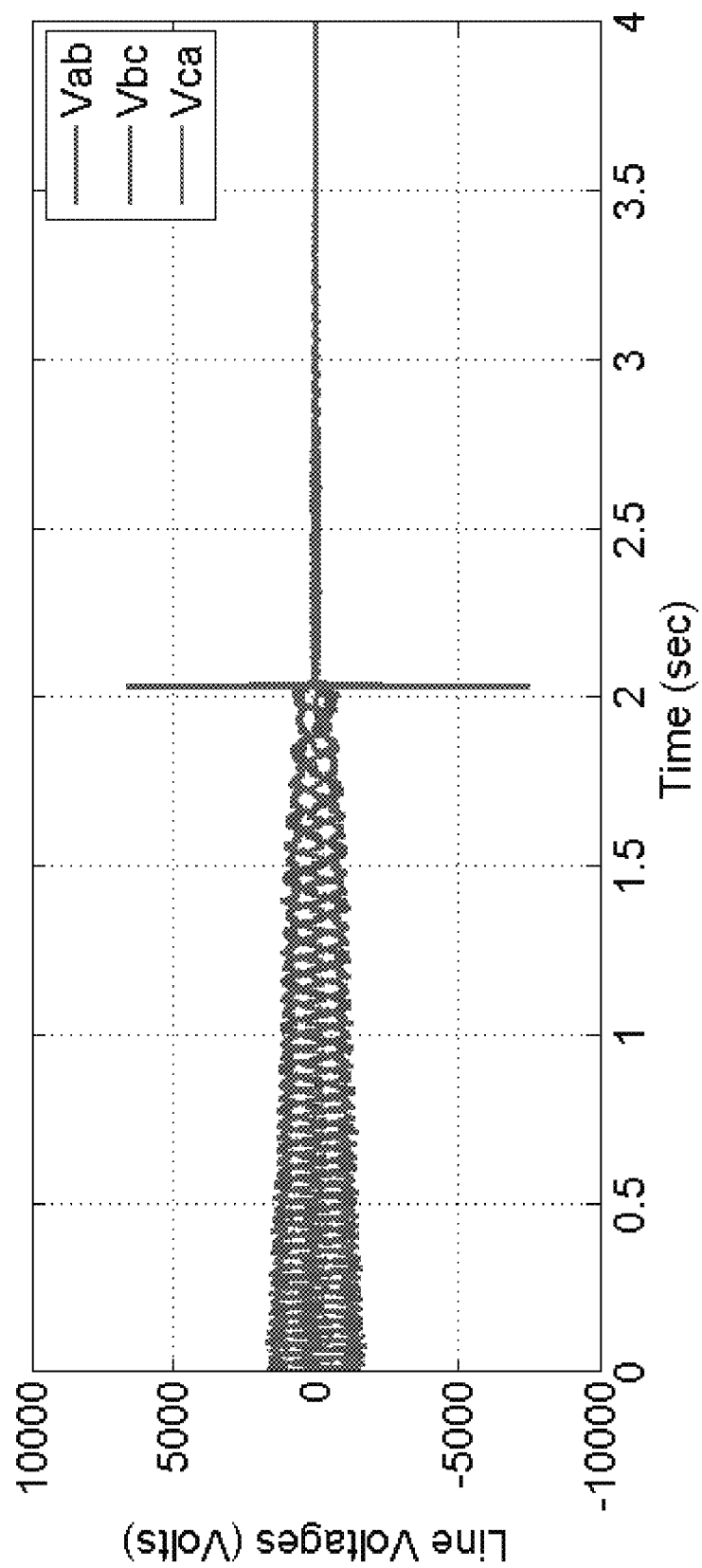
FIG. 18 illustrates a region in FIG. 17 from 2 seconds before until 2 seconds after a voltage spike, according to embodiments of the present invention.
Figure 19:
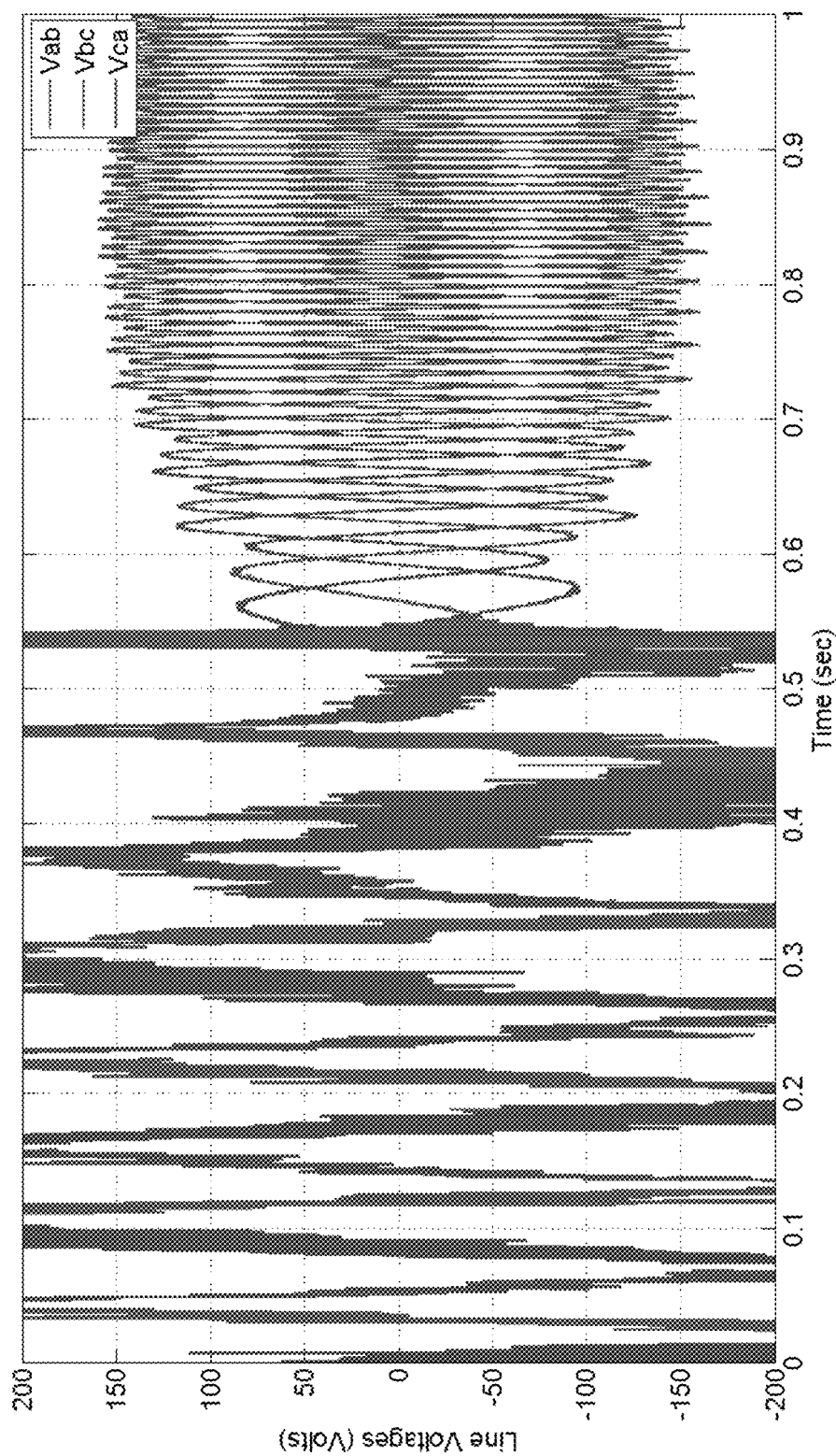
FIG. 19 shows a region of FIG. 17 further magnified to show a change in voltage sequencing, according to embodiments of the present invention.
Figure 20:
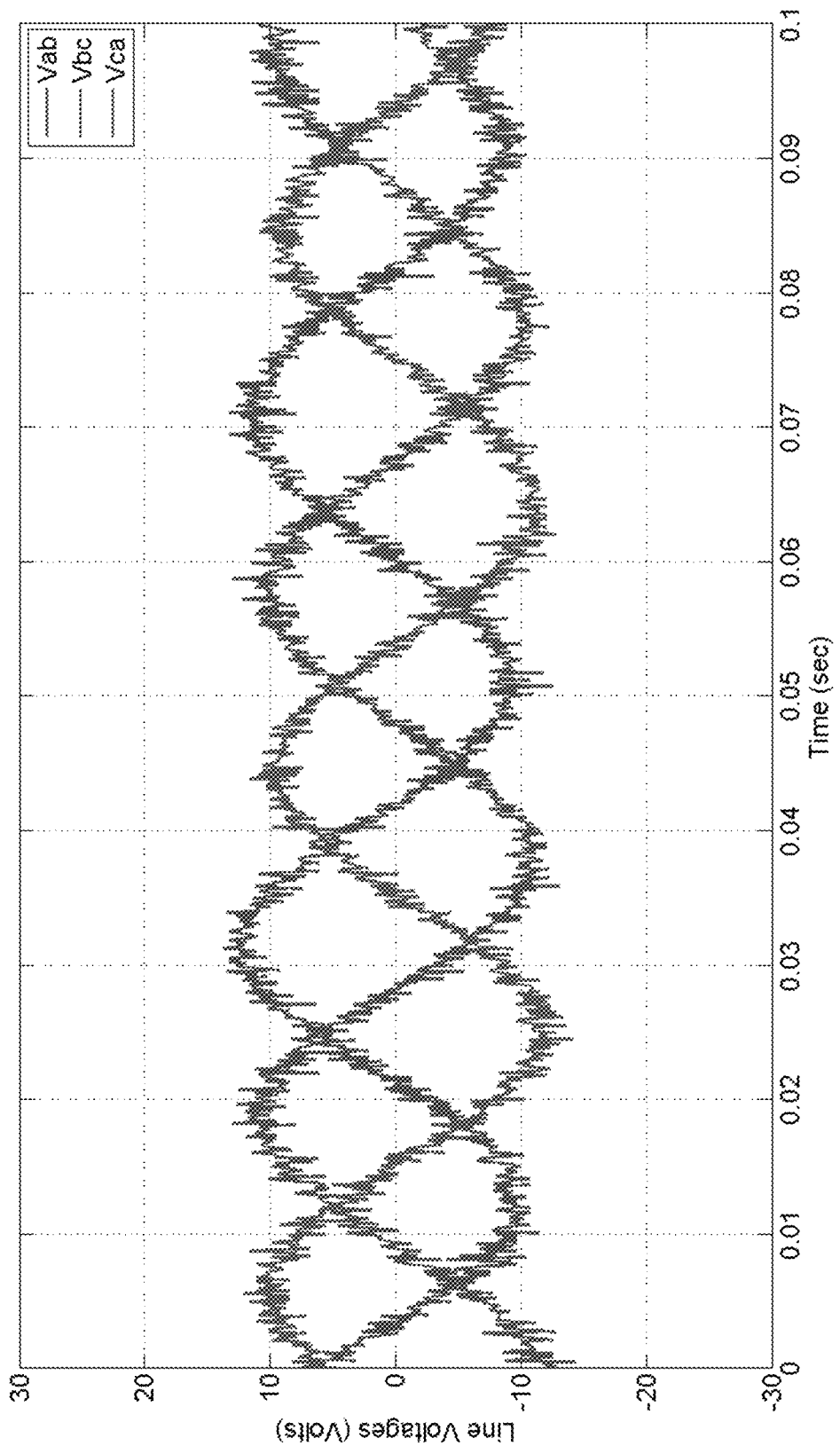
FIG. 20 illustrates voltage waveforms from two seconds after a voltage spike of shutdown #4, and induced voltage generation due to reverse rotation at approximately 25 Hz, according to embodiments of the present invention.

FIG. 18 covers the region in FIG. 17 from 2 seconds before until 2 seconds after voltage spike. In FIG. 19, this region is further magnified to show the change in voltage sequencing. FIG. 20 provides still further magnification and even more clearly shows the resulting voltage sequencing pattern. Specifically, FIG. 20 shows voltage waveforms are shown from two seconds after the voltage spike of shutdown #4, and clearly show induced voltage generation due to reverse rotation at approximately 25 Hz (or 1,500 rpm).

Observations from FIG. 20:

Voltages at this point are outside the calibration range of ForeSight; the uncalibrated voltages are +/−10V;

Phase sequence is Blue→Red→Green, indicating phase sequence reversal from the normal Blue→Green→Red sequence. This observation is consistent with reversal in the direction of the asset rotation following the large voltage spike;

Voltage frequency 25 Hz which for a 2-pole motor translates to synchronous speed of approximately 1,500 rpm.

Figure 21:
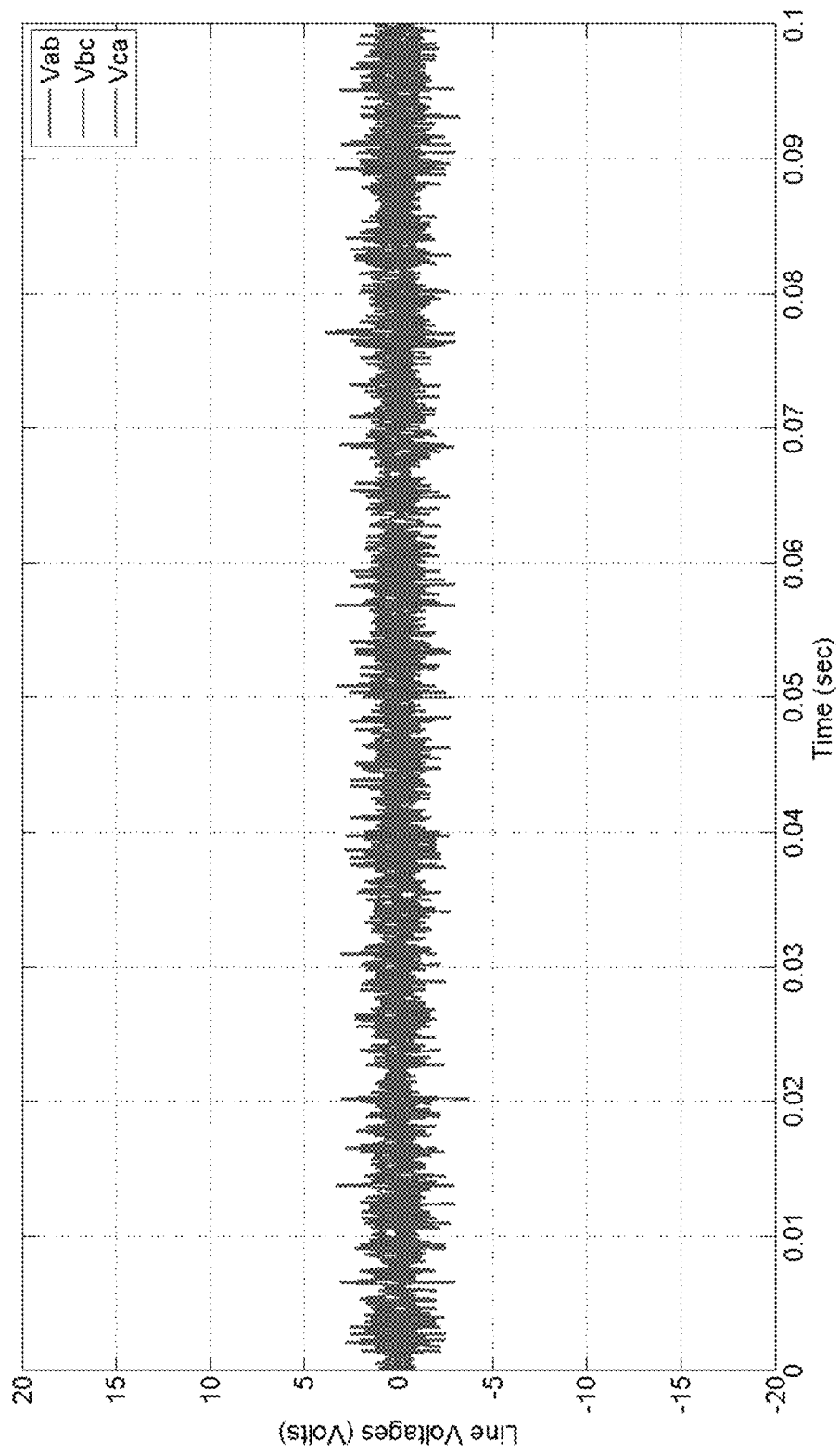
FIG. 21 shows voltage waveforms for a shutdown event, at a period ten seconds after a voltage spike showing no apparent voltage generation due to reverse rotation, according to embodiments of the present invention.

FIG. 21 shows voltage waveforms for shutdown #4, at a period ten (10) seconds after voltage spike showing no apparent voltage generation due to reverse rotation.

Figure 22:
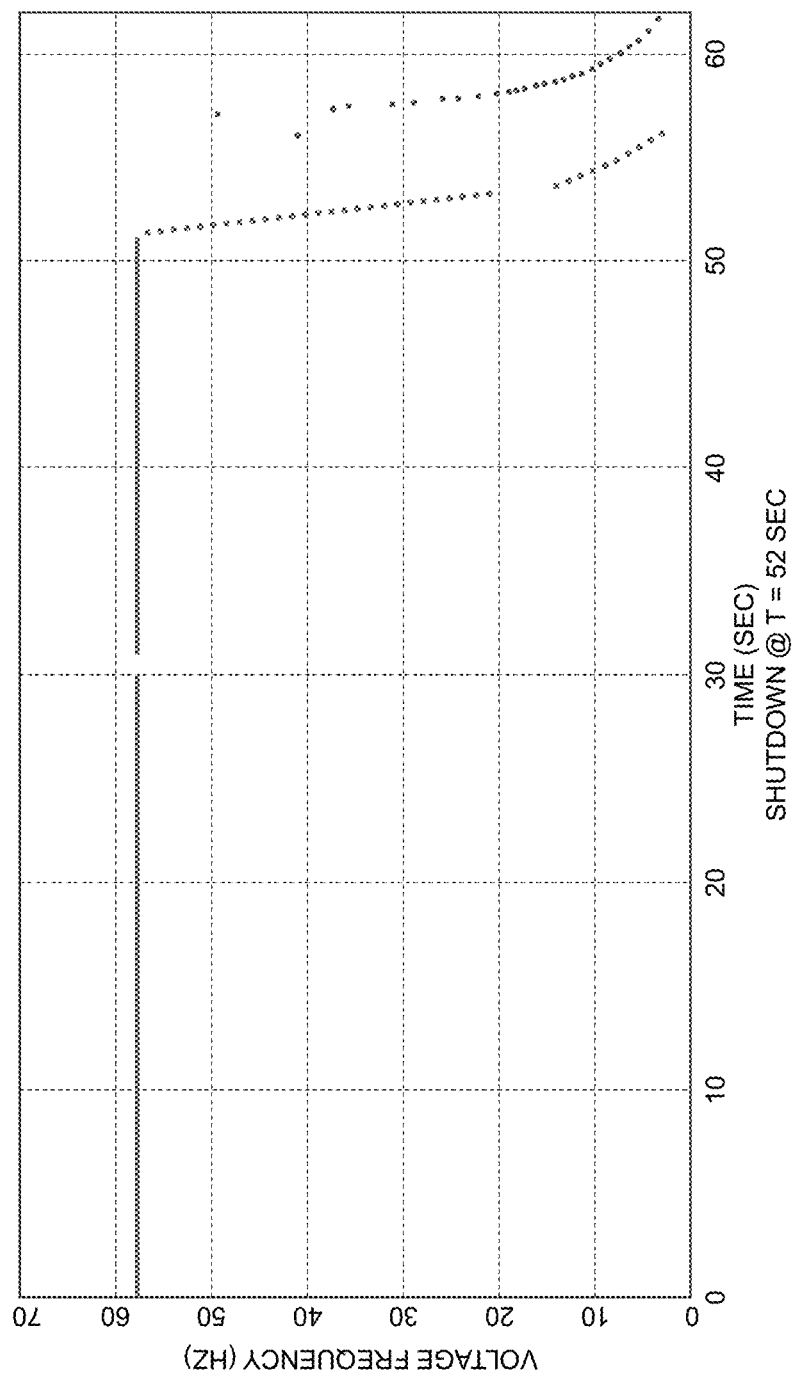
FIG. 22 shows measured voltage frequency plotted over time for a shutdown, according to embodiments of the present invention.

FIG. 22 shows the measured voltage frequency plotted over time for the shutdown on 8 Oct. 2016. The voltage frequency is a direct proxy for the pump rotation speed. For time 0-51 seconds, the voltage frequency is 58 Hz, equivalent to motor rotation speed of approximately 3,500 rpm. Frequency slows to 0 Hz (0 rpm) when power is interrupted to the unit. Frequency then accelerates rapidly in a reverse rotation, reaching 62.5 Hz (3,750 rpm) in a fraction of a second, then decreases to 0 in 6 sec.

Conclusions relating to 8 Oct. 2016 shutdown:
During the 8 Oct. 2016 shutdown event, the waveforms recorded by the ForeSight EWM system confirm a change in the electrical phase sequence of the voltages from the normal phase sequence, a fact which is consistent with reverse asset rotation compared to normal asset operation;

Prior to the phase sequence change, a large voltage spike is recorded at the point of near zero voltages, a fact which is consistent with a sudden change in direction of rotational acceleration. The transition time appears very short between near zero rotation in the correct direction and high rotation in the reverse direction;

The duration of reverse rotation is estimated at about 6 seconds before voltage waveforms become comparable to background noise levels;

The corresponding reverse synchronous speed (in rpm) reaches approximately 3,750 rpm.

No Backflow Event on 14 Nov. 2016

Figure 23:
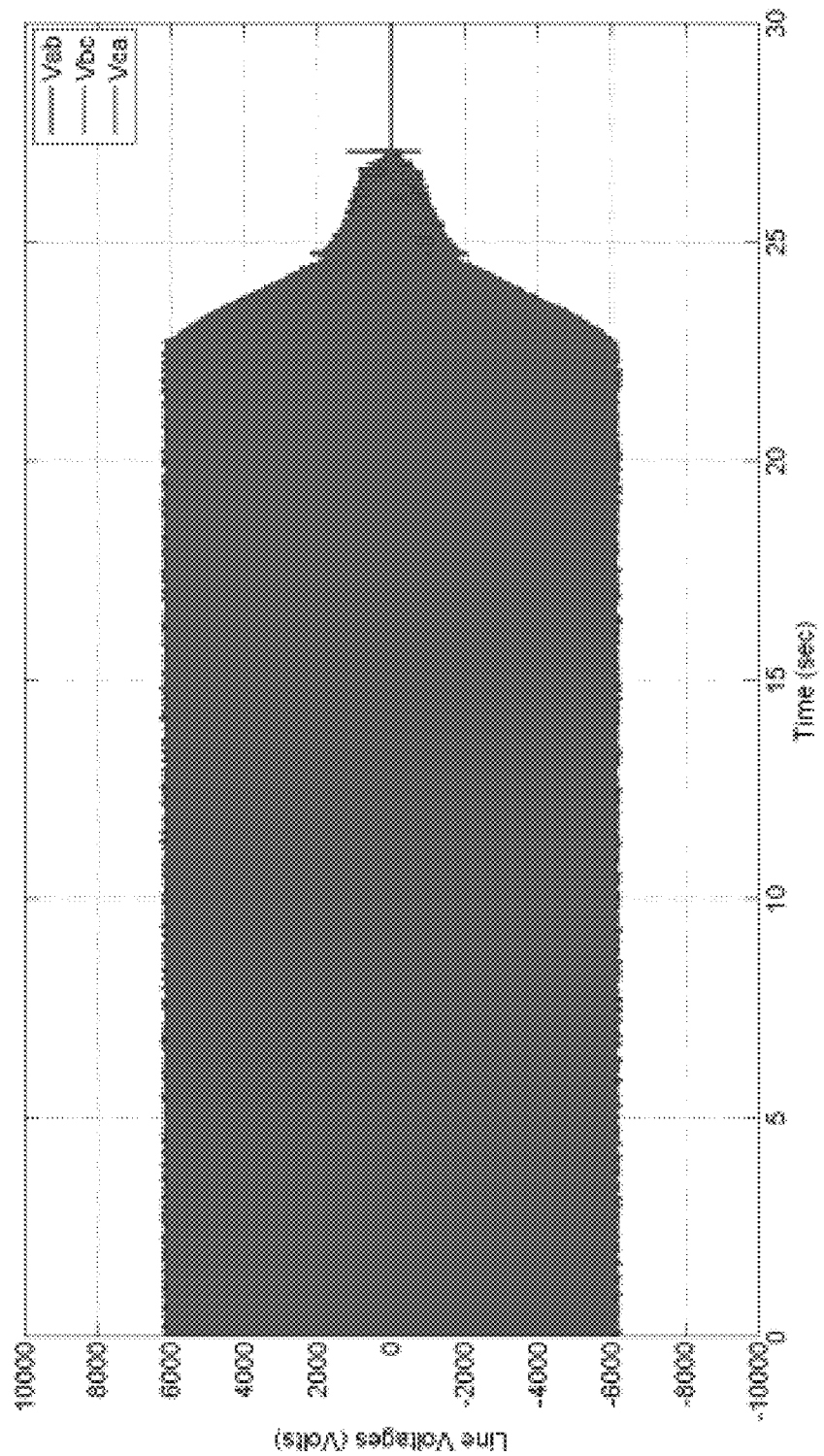
FIG. 23 shows three phase voltage waveforms measured from 27 seconds before until 3 seconds after a voltage spike of a shutdown event with no suspected backflow as measured from process instrumentation, according to embodiments of the present invention.
Figure 24:
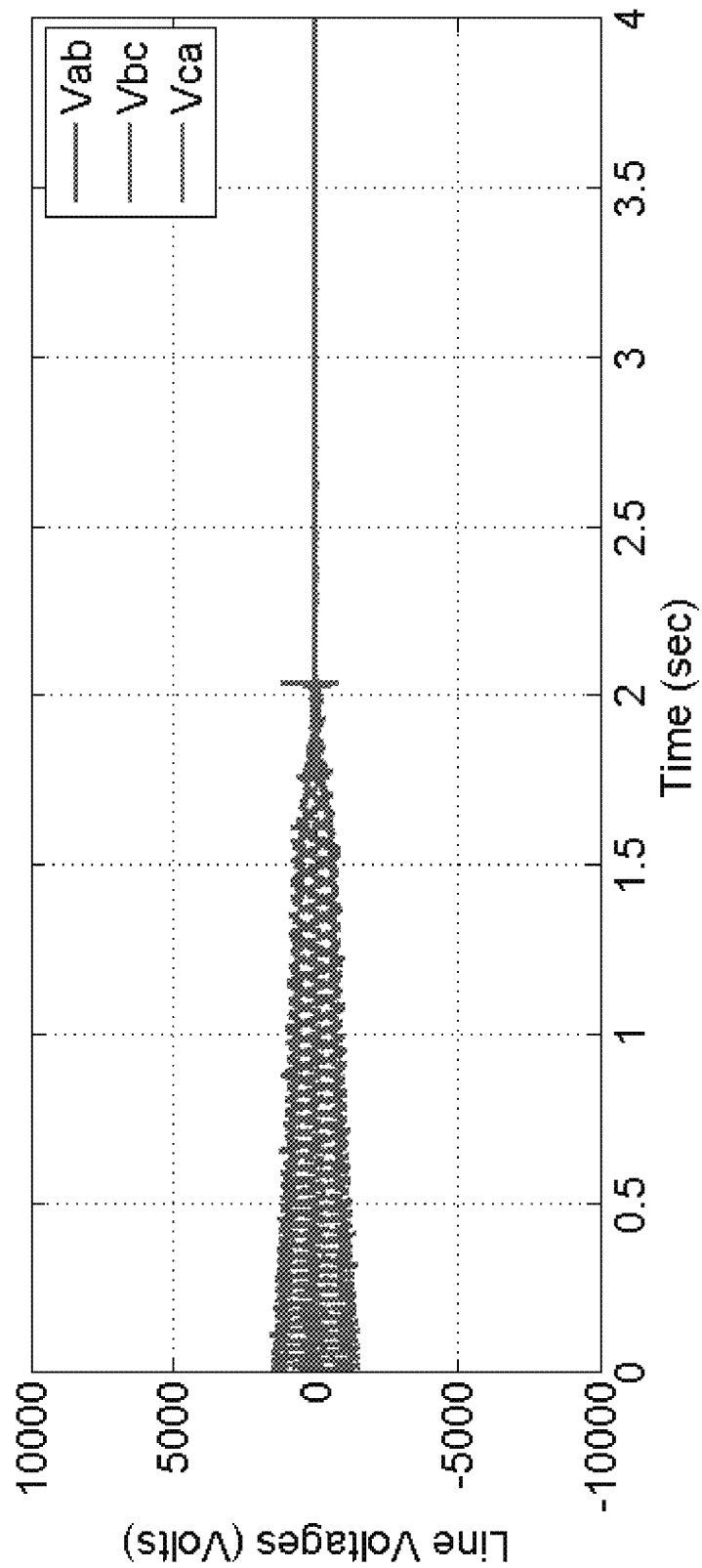
FIG. 24 depicts an interval from 2 second before until 2 seconds after a voltage spike, according to embodiments of the present invention.

FIG. 23 shows the three phase voltage waveforms measured from 27 seconds before until 3 seconds after the voltage spike of the 14 Nov. 2016 shutdown event (Shutdown #8), with no suspected backflow as measured from process instrumentation. FIG. 24 covers the time segment from 2 second before until 2 seconds after the voltage spike.

Figure 25:
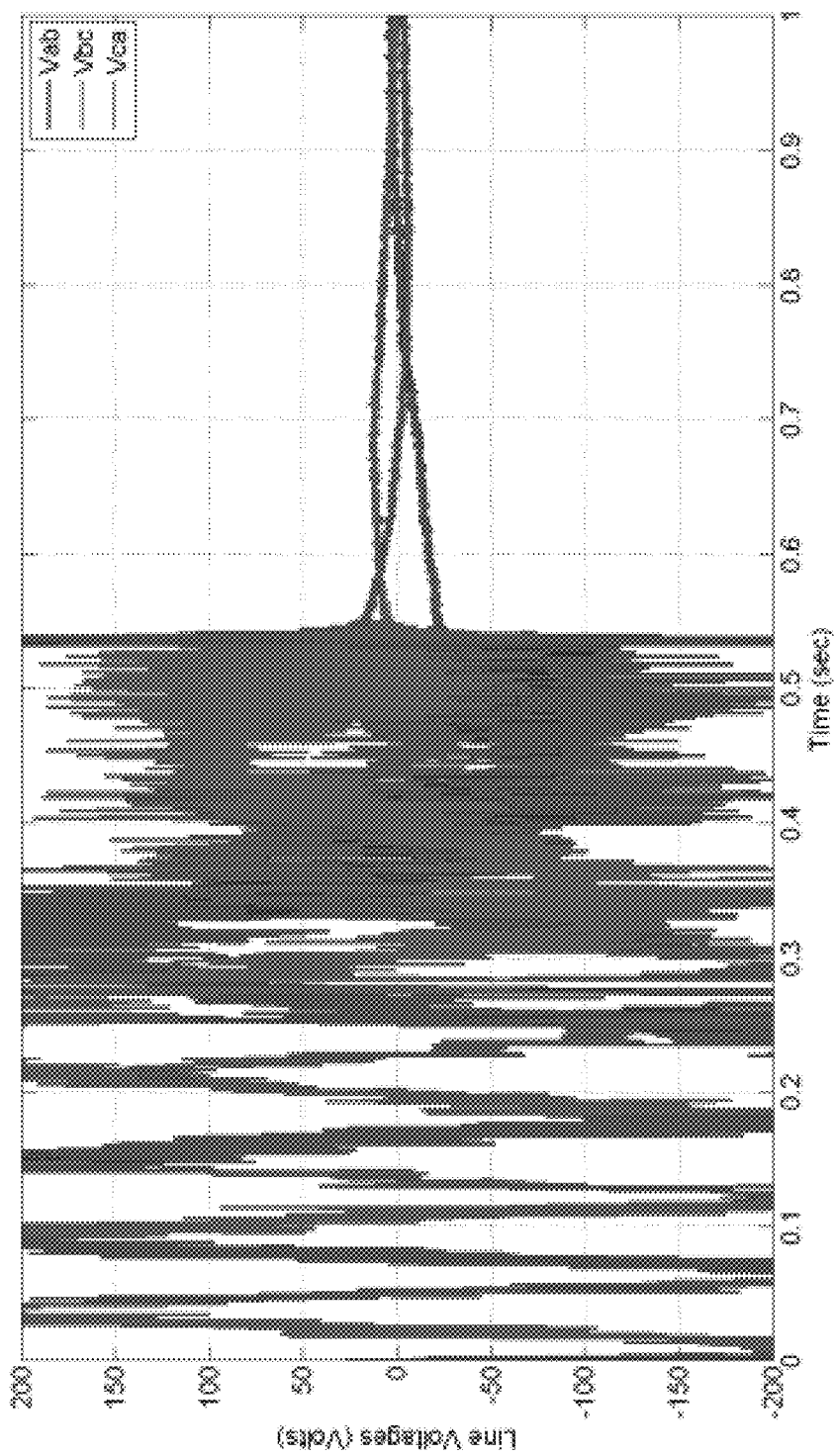
FIG. 25 is a further magnified version of FIG. 23 for a shutdown showing no induced voltage and, hence, no motor rotation after a voltage spike, according to embodiments of the present invention.
Figure 26:
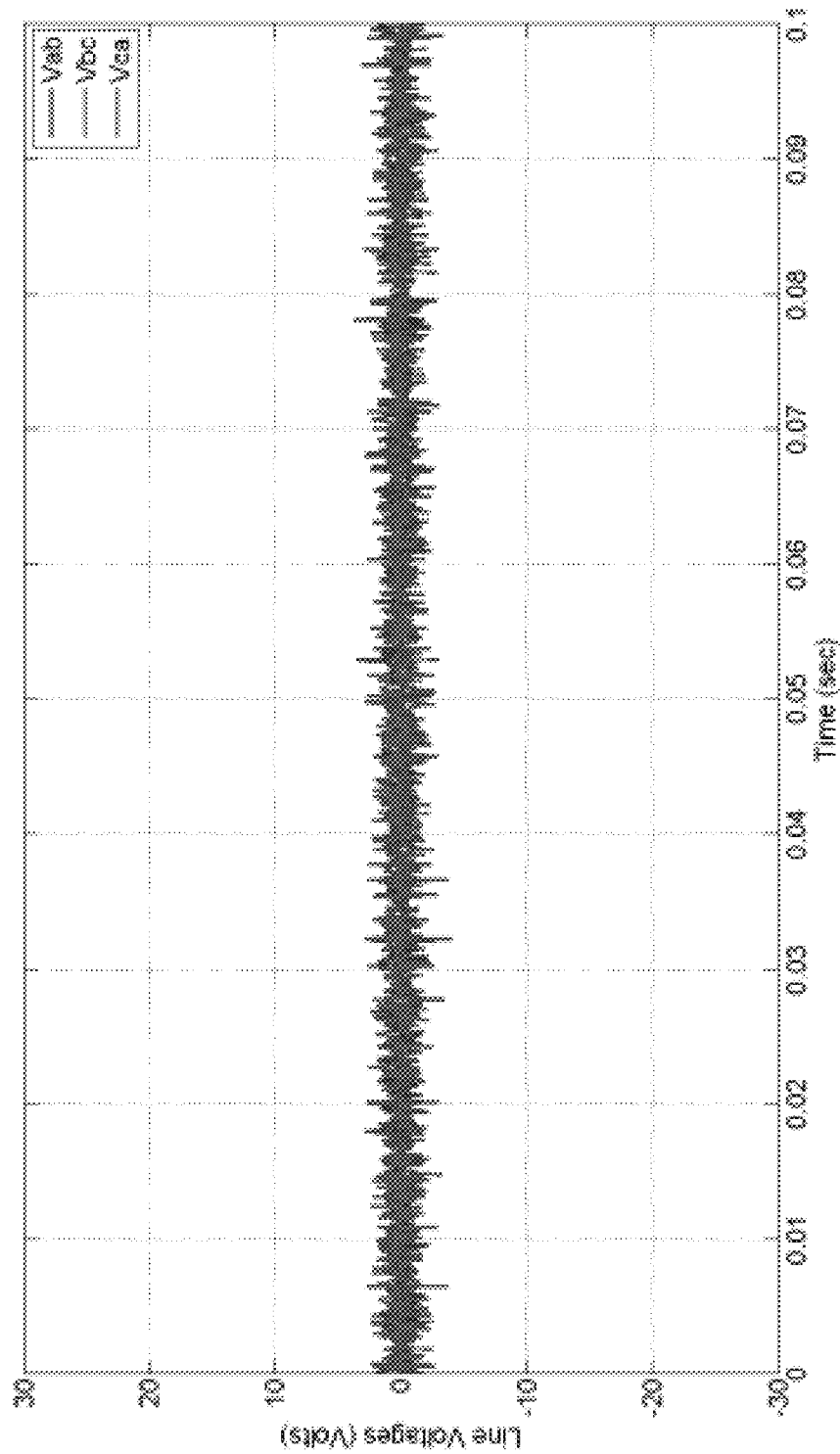
FIG. 26 is still further magnified version of FIG. 23, showing two seconds after a voltage spike, according to embodiments of the present invention.

FIG. 25 is a further magnified version of FIG. 23 for shutdown #8 and indicates no induced voltage and, hence, no motor rotation after the voltage spike. FIG. 26 is still further magnified version of FIG. 23, showing two seconds after the voltage spike. Again, FIG. 26 shows no substantial voltage generation as would be caused if reverse rotation had occurred.

Figure 27:
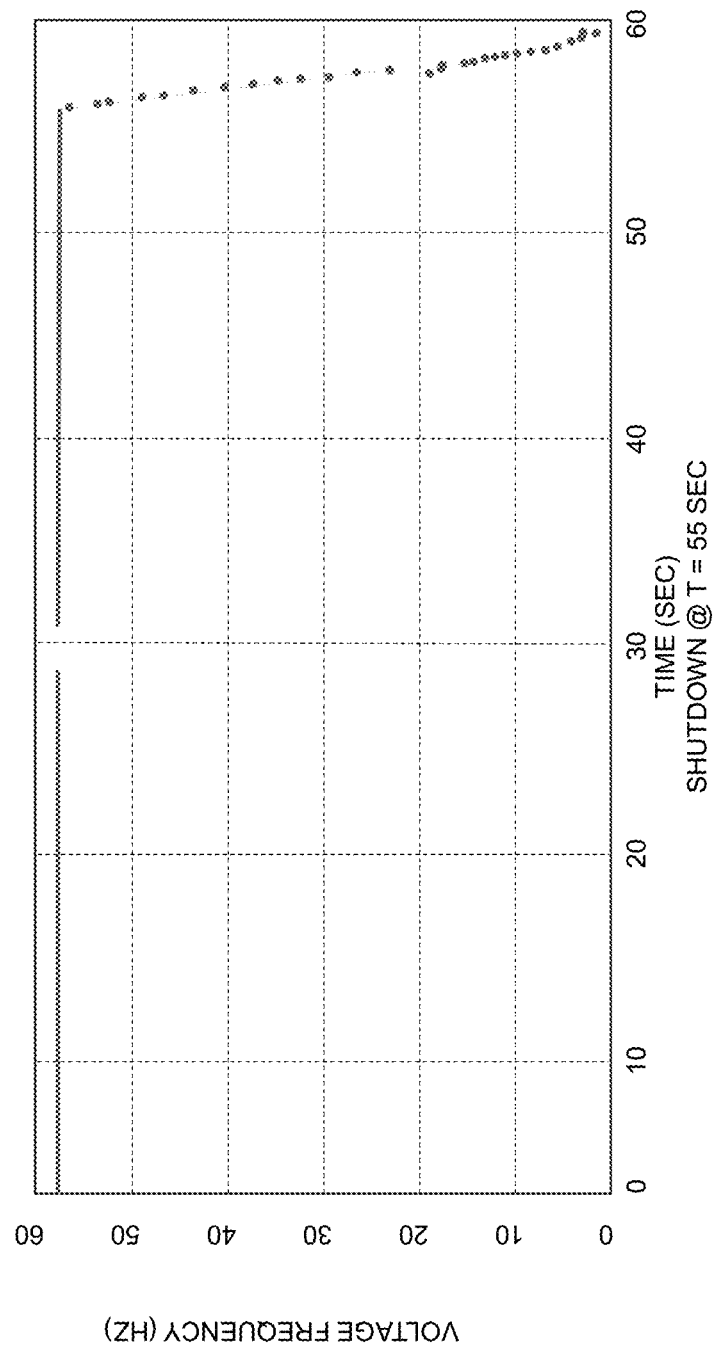
FIG. 27 shows a measured voltage frequency plotted over time for a shutdown, according to embodiments of the present invention.

FIG. 27 shows the measured voltage frequency plotted over time for the shutdown on 14 Nov. 2016. The voltage frequency is a direct proxy for the pump rotation speed. For time 0-55 seconds, the voltage frequency is 58 Hz, equivalent to motor rotation speed of approximately 3,500 rpm. Frequency then slows to 0 Hz (0 rpm) when power is interrupted to the unit.

Conclusions relating to 14 Nov. 2016 Shutdown:
During the 14 Nov. 2016 shutdown event, the waveforms recorded by the ForeSight EWM system show no change in the electrical phase sequence of the voltages and conclude the event generated no reverse asset rotation.

Figure 28A:
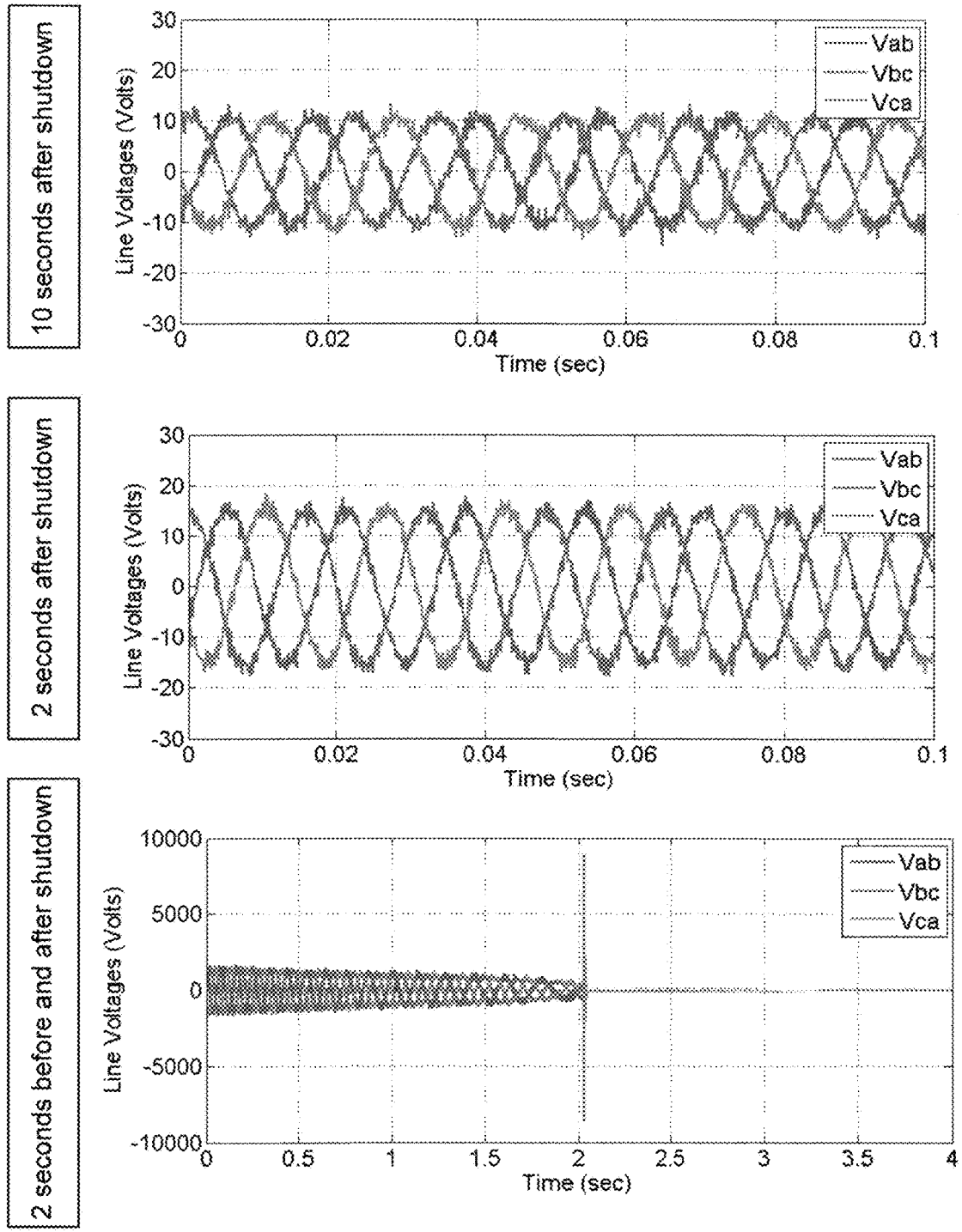
FIG. 28A shows a side by side comparison of induced voltages for one shutdown during three time segments, according to embodiments of the present invention.
Figure 28B:
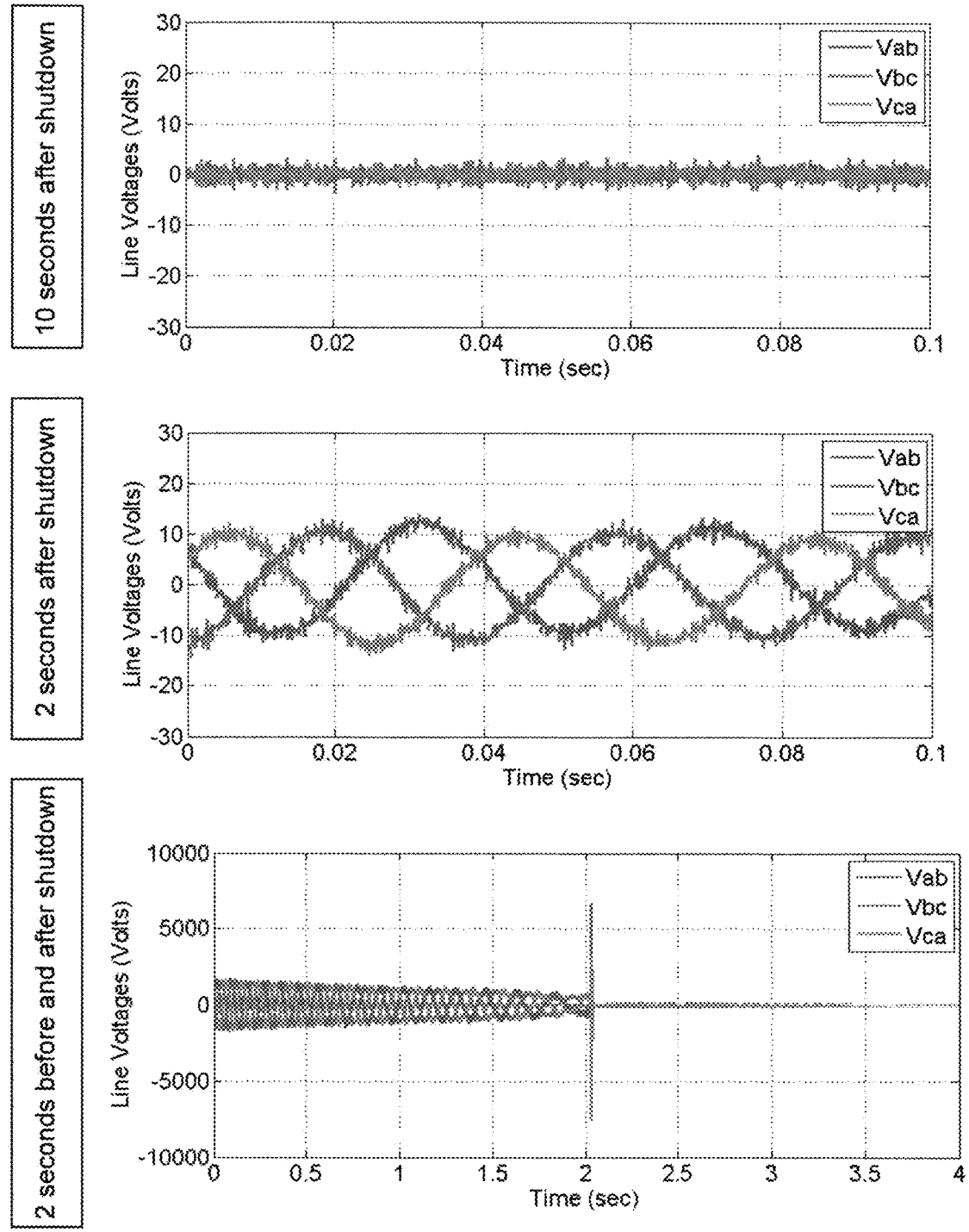
FIG. 28B shows a side by side comparison of induced voltages for another shutdown during three time segments, according to embodiments of the present invention.
Figure 28C:
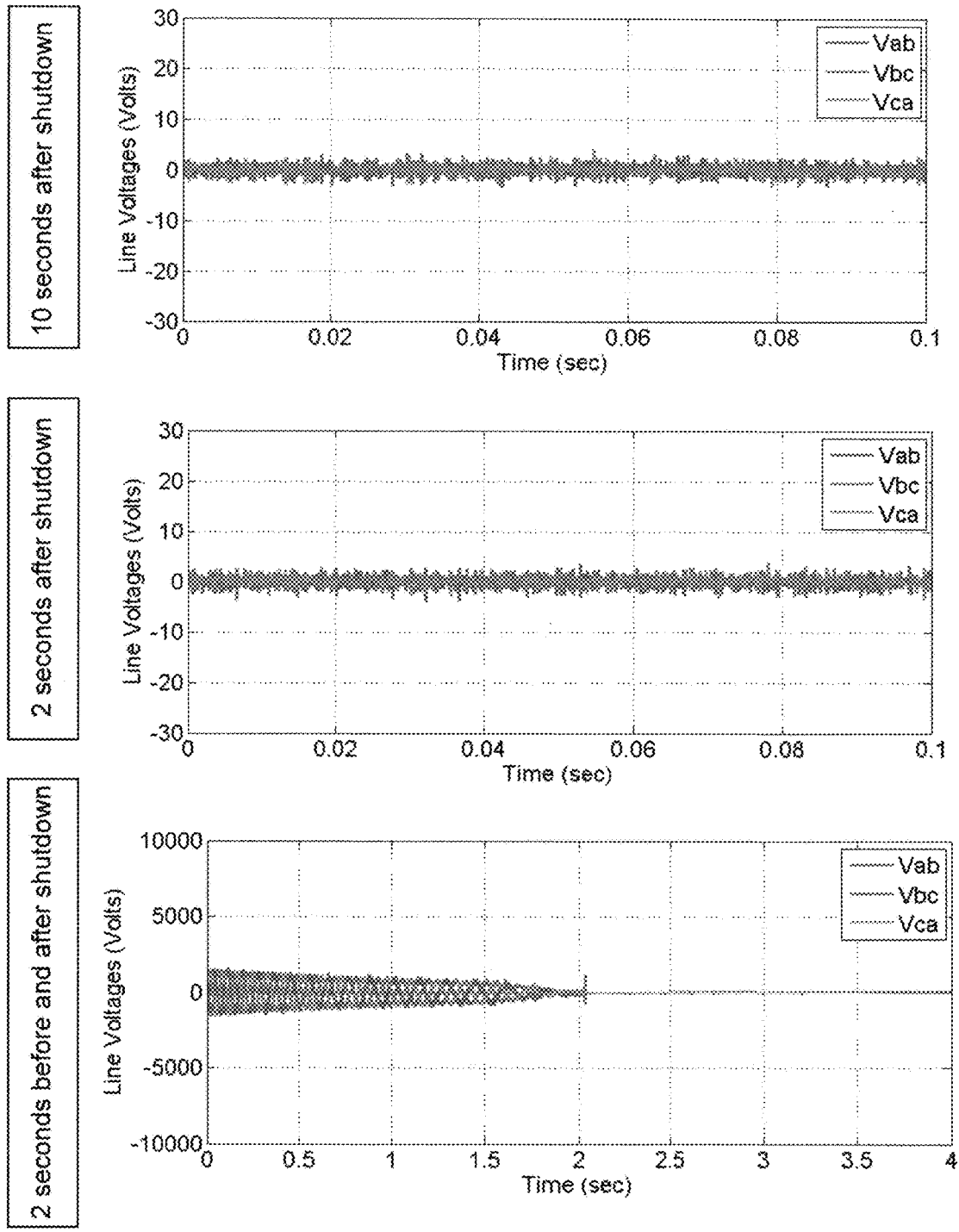
FIG. 28C shows a side by side comparison of induced voltages for yet another shutdown during three time segments, according to embodiments of the present invention.

FIGS. 28A, 28B, and 28C each show, for a respective shutdown, a side by side comparison of the induced voltages during three time segments. In the shutdown of FIG. 28A, shutdown #1, there was a long duration reverse rotation. In the shutdown of FIG. 28B, shutdown #4, there was a short duration reverse rotation. In the shutdown of FIG. 28C, shutdown #8, there was no reverse rotation. The different time segments are shown from top to bottom in each of FIGS. 28A, 28B and 28C. In the top set of voltages, the time segments for each shutdown begin at 10 seconds after the shutdowns. In the middle set, the time segments begin two seconds after the shutdowns. In the bottom set, the time segments begin two seconds before the shutdowns and continue until two seconds after the shutdowns.

Overall Observations Regarding Backflow Events
Preliminary study of all the shutdowns (except #7 for which data are not available) demonstrates that all but one shutdown (#8) exhibit indications consistent with reverse rotation of the unit and induced voltage generation for some period of time.

Shutdown #1 has the longest observed indication of reverse rotation at approximately 9.5 minutes.

Shutdowns #2, #3, #4, #5, and #6 have indications consistent with reverse rotation that last approximately 6-8 seconds.

Shutdowns #9 and #10 exhibit indicators of longer reverse rotation of approximately 28 and 18 seconds, respectively.

Shutdown #8 exhibits no indications of reverse rotation.

These observations are summarized in the following table:

| # | Approx. beginning of shutdown | Backflow Suspected? | Consistent w/ Reverse Rotation? | Duration (sec) | Voltage Spike (Normalized) | Max Reverse Rotational Speed (Hz) |
|---|---|---|---|---|---|---|
| 1 | 9/20 around 12:30 am | Yes | Yes | 577 | 1 | 62.5 |
| 2 | 9/20 around 10:20 pm | No | Yes | 6 | 0.83 | 64.5 |
| 3 | 9/26 around 7:30 am | No | Yes | 8 | 0.89 | 62.5 |
| 4 | 10/8 around 8:35 am | No | Yes | 6 | 0.83 | 63.5 |
| 5 | 10/10 around 2:25 am | No | Yes | 7 | 0.14 | 63.5 |
| 6 | 10/12 around 9:40 pm | No | Yes | 7 | 0.14 | 63.5 |
| 7 | 10/24 around 2:45 pm* | No | — | — | — | — |
| 8 | 11/14 around 6:20 am | No | No | 0 | 0.11 | 0 |
| 9 | 11/18 around 10:15 pm | No | Yes | 28 | 0.16 | 64.5 |
| 10 | 11/20 around 9:20 pm | No | Yes | 18 | 0.89 | 64.5 |

*data missing due to power outage

Conclusions from Tests
The ForeSight EWM system recorded waveforms that confirm indications of a lengthy electrical machine reverse rotation during the 20 Sep. 2016 shutdown event (shutdown #1) and during multiple other shutdowns as outlined herein above;

The change in the rotational direction happens very quickly. The asset appears to rapidly accelerate in the reverse rotation direction, reaching speeds of 3,750 rpm in less than 1 second;

For each shutdown with a reverse rotation event, a large voltage spike is seen at the time the voltages drop to near zero following the shutdown and prior to the electrical phase sequence change (reverse rotation);

Durations of reverse rotation vary widely for the events studied, ranging from 6 to 577 seconds.

As is also explained herein, the new applications of the ForeSight™ EWM system for detecting reverse rotation, etc., may include applications for other arrangements of motors or generators other than those explicitly described in the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. An association may be accomplished by a database merge function, for example, using a key field for respective data tables.

A host computer system may provide a website, webpages or other internet-based graphical user interfaces accessible to users. The term webpage as it is used herein is not meant to limit the type of documents and application modules that might be used to interact with the user. For example, a typical website might include, in addition to standard HTML documents, various forms, applets, scripts, server pages, extensible markup language (XML), dynamic HTML, cascading style sheets (CSS), helper application modules, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Herein, "based on" means "based at least partly on," unless explicitly indicated otherwise, such as by the use of "solely based on" or "based solely on." Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

The invention claimed is:

1. A computer system implemented method for determining rotation of a de-energized electric machine without accessing the machine, wherein the machine in the energized state rotates in a reference direction, the method comprising:
   detecting by the computer system, for a recorded waveform of multi-phase electrical power indicia for supply conductors of the machine measured remotely from the machine, that a first time segment of the recorded waveform corresponds to an electrically energized state of the machine and that a second time segment of the recorded waveform corresponds to an electrically de-energized state of the machine, wherein since the second time segment of the recorded waveform is for the de-energized state, the second time segment is for times when the recorded waveform arises from power induced on the supply conductors for the machine by rotation of the machine; and
   determining by the computer system that the machine in the de-energized state has rotated in a direction reverse to the reference direction, wherein the determining that the machine in the de-energized state has rotated in a direction reverse to the reference direction includes the computer system comparing the first and second time segments of the recorded waveform.

2. A computer system comprising:
   at least one processor; and
   a computer readable storage medium accessible to the at least one processor, the computer readable storage medium having program instructions embodied therewith, the program instructions being executable by the at least one processor to cause the at least one processor to perform a method comprising:

detecting by the computer system, for a recorded waveform of multi-phase electrical power indicia for supply conductors of the machine measured remotely from the machine, that a first time segment of the recorded waveform corresponds to an electrically energized state of the machine and that a second time segment of the recorded waveform corresponds to an electrically de-energized state of the machine, wherein since the second time segment of the recorded waveform is for the de-energized state, the second time segment is for times when the recorded waveform arises from power induced on the supply conductors for the machine by rotation of the machine; and determining by the computer system that the machine in the de-energized state has rotated in a direction reverse to the reference direction, wherein the determining that the machine in the de-energized state has rotated in a direction reverse to the reference direction includes the computer system comparing the first and second time segments of the recorded waveform.

3. The computer system of claim 2, wherein the computer system determining that the machine in the de-energized state has rotated in a direction reverse to the reference direction includes:

detecting by the computer system, for the first time segment of the waveform, a first phase sequence of the power indicia; and detecting by the computer system, for the second time segment of the waveform, a second phase sequence of the power indicia;

wherein the computer system comparing the first and second time segments of the waveform includes the computer system comparing the first and second phase sequences of the waveform, and wherein the determining that the machine in the de-energized state has rotated in a direction reverse to the reference direction includes detecting, based on the comparing, that the second phase sequence does not correspond to the first phase sequence.

4. The computer system of claim 3, the program instructions being executable by the at least one processor to cause the at least one processor to perform a method further comprising:

determining how long the machine rotated in the reverse direction by determining a duration for which the second phase sequence occurred.

5. The computer system of claim 3 the supply conductors having switch ends remote from the machine and conductively coupled to a switch and having machine ends conductively coupled to the machine for connecting and disconnecting the machine via the switch to an electrical power distribution network, and the power indicia being measured at the switch ends of the supply conductors.

6. The computer system of claim 5, where the machine is a generator and the supply conductors for the machine in the energized state supply power from the machine through the switch to the power distribution network.

7. The computer system of claim 5, where the machine is a motor and the supply conductors for the machine in the energized state supply power from the power distribution network through the switch to the machine.

8. The computer system of claim 2, where the detecting that a first time segment of the waveform corresponds to an electrically energized state of the machine and that a second time segment of the waveform corresponds to an electrically de-energized state of the machine is based solely on the waveform of the power indicia for the supply conductors.

9. The computer system of claim 8, the power indicia for the supply conductor waveform consists solely of voltage, where the detecting that a first time segment of the waveform corresponds to an electrically energized state of the machine and that a second time segment of the waveform corresponds to an electrically de-energized state of the machine is based solely on the voltage.

10. The computer system of claim 2, where the detecting that a first time segment of the waveform corresponds to an electrically energized state of the machine and that a second time segment of the waveform corresponds to an electrically de-energized state of the machine is based on frequency of the power indicia for the supply conductor waveform.

11. The computer system of claim 2, power indicia for the supply conductor waveform including current, where the detecting that a first time segment of the waveform corresponds to an electrically energized state of the machine and that a second time segment of the waveform corresponds to an electrically de-energized state of the machine is based on the supply conductor waveform current for at least one of the supply conductors.

12. The computer system of claim 2, the program instructions being executable by the at least one processor to cause the at least one processor to perform a method further comprising:

determining a frequency at which the machine rotated in the reverse direction in the de-energized state, where determining the frequency includes determining a frequency of the second time segment of the waveform.

13. The computer system of claim 2, wherein both the first and second time segments of the waveform are recorded time segments.

14. The computer system of claim 2, the program instructions being executable by the at least one processor to cause the at least one processor to perform a method further comprising:

recording the waveform, wherein the detecting that the first time segment of the waveform corresponds to an electrically energized state of the machine and that a second time segment of the waveform corresponds to an electrically de-energized state of the machine is performed by the computer system at least partly in concurrence with the recording.

15. The computer system of claim 2, wherein the waveform includes an indicator of a control signal state.

16. The computer system of claim 2, wherein the machine is supplied by a variable frequency drive and the detecting that the second time segment of the waveform corresponds to an electrically de-energized state of the machine includes detecting that at least one of the phases of the waveform does not have a substantially constant frequency above a certain frequency threshold.

17. A computer program product for determining rotation of a shaft of a de-energized electric machine without accessing the machine, the computer program product comprising a computer readable storage medium having program instructions embodied therewith, the program instructions executable by at least one processor of a computer system to cause the computer system to perform a method comprising:

detecting by the computer system, for a recorded waveform of multi-phase electrical power indicia for supply conductors of the machine measured remotely from the machine, that a first time segment of the recorded waveform corresponds to an electrically energized state of the machine and that a second time segment of the recorded waveform corresponds to an electrically de-energized state of the machine, wherein since the second time segment of the recorded waveform is for the de-energized state, the second time segment is for times when the recorded waveform arises from power induced on the supply conductors for the machine by rotation of the machine; and determining by the computer system that the machine in the de-energized state has rotated in a direction reverse to the reference direction, wherein the determining that the machine in the de-energized state has rotated in a direction reverse to the reference direction includes the computer system comparing the first and second time segments of the recorded waveform.

18. The computer program product of claim 17, wherein determining that the machine in the de-energized state has rotated in a direction reverse to the reference direction includes:

detecting, for the first time segment of the at least one waveform, a first phase sequence of the power indicia; and detecting, for the second time segment of the at least one waveform, a second phase sequence of the power indicia;

wherein comparing the first and second time segments of the waveform includes comparing the first and second phase sequences of the waveform, and wherein the determining that the machine in the de-energized state has rotated in a direction reverse to the reference direction includes detecting, based on the comparing, that the second phase sequence does not correspond to the first phase sequence.

19. The computer program product of claim 17, where the determining that a first time segment of the waveform corresponds to an electrically energized state of the machine and that a second time segment of the waveform corresponds to an electrically de-energized state of the machine is based solely on the waveform of the power indicia for the respective supply conductors.

20. The computer program product of claim 19, wherein the power indicia for the supply conductor waveform consists solely of voltage, the detecting that a first time segment of the waveform corresponds to an electrically energized state of the machine and that a second time segment of the waveform corresponds to an electrically de-energized state of the machine is based solely on the voltage.

* * * * *